US009930656B2

(12) United States Patent
Niu et al.

(10) Patent No.: US 9,930,656 B2
(45) Date of Patent: Mar. 27, 2018

(54) CELL SEARCH AND SYNCHRONIZATION IN MILLIMETER-WAVE CAPABLE SMALL CELLS

(71) Applicant: INTEL IP CORPORATION, Santa Clara, CA (US)

(72) Inventors: Huaning Niu, California, CA (US); Qian Li, Hillsboro, OR (US); Yang Tang, Pleasanton, CA (US); Sameer Pawar, Santa Clara, CA (US); Christian Ibars Casas, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 136 days.

(21) Appl. No.: 14/977,412

(22) Filed: Dec. 21, 2015

(65) Prior Publication Data
US 2017/0181134 A1 Jun. 22, 2017

(51) Int. Cl.
*H04W 4/00* (2009.01)
*H04W 72/04* (2009.01)
*H04W 74/08* (2009.01)
*H04L 5/14* (2006.01)
*H04L 5/00* (2006.01)
*H04B 17/318* (2015.01)
*H04W 56/00* (2009.01)

(52) U.S. Cl.
CPC ........ *H04W 72/042* (2013.01); *H04B 17/318* (2015.01); *H04L 5/0007* (2013.01); *H04L 5/14* (2013.01); *H04W 74/0833* (2013.01); *H04W 56/001* (2013.01)

(58) Field of Classification Search
None
See application file for complete search history.

(56) References Cited

U.S. PATENT DOCUMENTS

2014/0139372 A1\* 5/2014 Seol ..................... H01Q 3/2605
342/367
2014/0177607 A1\* 6/2014 Li ..................... H04W 74/0833
370/336
(Continued)

OTHER PUBLICATIONS

3GPP TS 36.211, LTE; Evolved Universal Terrestrial Radio Access (E-UTRA), Physical channels and modulation, Nov. 1, 2008, v8.3.0, Sophia Antipolis, France, (Release 8).
(Continued)

*Primary Examiner* — Bob Phunkulh
(74) *Attorney, Agent, or Firm* — Patent Capital Group

(57) ABSTRACT

Technology described herein relates to systems, methods, and computer readable media to enable a millimeter wave capable small cell (MCSC) devices to receive a handover of a user equipment from a universal mobile telecommunications system terrestrial radio access node B (eNB). In particular, systems and methods are described for user equipment (UE) association with a MCSC operating as a booster for an eNB in a time division duplexing (TDD) system, including identification of and communication on preferred cell sector between the UE and the MCSC. Protocols for concurrently performing a beam search and time and frequency synchronization for downlink communication are also described. Several sub-frame designs to facilitate these protocols are also described.

23 Claims, 17 Drawing Sheets

(56) References Cited

U.S. PATENT DOCUMENTS

| | | | |
|---|---|---|---|
| 2015/0071103 A1 | 3/2015 | Xu et al. | |
| 2015/0223088 A1 | 8/2015 | Niu et al. | |
| 2015/0282051 A1 | 10/2015 | Niu et al. | |
| 2015/0350992 A1 | 12/2015 | Han et al. | |
| 2015/0382205 A1* | 12/2015 | Lee | H04B 7/0417 370/329 |
| 2016/0036541 A1* | 2/2016 | Siomina | H04B 17/345 455/422.1 |
| 2016/0057663 A1* | 2/2016 | Teyeb | H04W 36/0027 455/436 |
| 2016/0057708 A1* | 2/2016 | Siomina | H04W 52/243 455/452.2 |
| 2016/0157267 A1* | 6/2016 | Frenne | H04B 7/086 370/329 |
| 2016/0269087 A1* | 9/2016 | Subramanian | H04B 7/024 |
| 2016/0277225 A1* | 9/2016 | Frenne | H04W 56/0015 |
| 2016/0308637 A1* | 10/2016 | Frenne | H04J 11/0069 |
| 2016/0337916 A1* | 11/2016 | Deenoo | H04W 8/22 |
| 2016/0345216 A1* | 11/2016 | Kishiyama | H04W 36/0083 |
| 2017/0006539 A1* | 1/2017 | Kakishima | H04B 7/0478 |
| 2017/0006613 A1* | 1/2017 | Kakishima | H04B 7/0413 |
| 2017/0034812 A1* | 2/2017 | Deng | H04W 72/046 |
| 2017/0048826 A1* | 2/2017 | Kishiyama | H04W 16/28 |
| 2017/0055298 A1* | 2/2017 | Pawar | H04L 5/1469 |
| 2017/0094531 A1* | 3/2017 | Kakishima | H04W 16/28 |
| 2017/0099092 A1* | 4/2017 | Kakishima | H04B 7/0617 |

OTHER PUBLICATIONS

International Search Report and Written Opinion issued in PCT/US2016/59920 dated Jan. 17, 2017; 13 pages.

\* cited by examiner

FIG. 6A
FIG. 6B
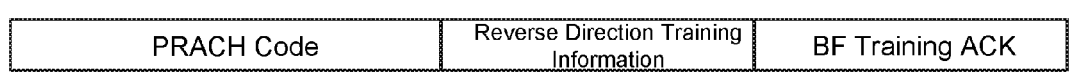
FIG. 6C
FIG. 6

US 9,930,656 B2

CELL SEARCH AND SYNCHRONIZATION IN MILLIMETER-WAVE CAPABLE SMALL CELLS

BACKGROUND

Small cells are low-powered radio access nodes that may operate as part of a wireless communication network, with a small cell operational range that may be on the order of 10 meters (m) to 1 kilometer (km). Small cells may be compared to macro cells which may have a range of 1 km to greater than 10 km. Millimeter-wave capable small cells (MCSCs) are small cells that use millimeter electromagnetic waves, including waves with a frequency between 30 gigahertz and 300 gigahertz, for communication.

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node in an Evolved Universal Terrestrial Radio Access Network (E-UTRAN) system is referred to as an eNode B (also commonly denoted as evolved Node Bs, enhanced Node Bs, eNodeBs, or eNBs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

The number of users of wireless devices has increased dramatically in recent years. In addition, the amount of data transmitted by each user has substantially increased. However, the bandwidth available for wireless transmission has not increased substantially. One way to accommodate the ever increasing amount of data that is wirelessly communicated is to increase the density of the nodes.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6A illustrates an example of an access code that can be used as part of a sector sweep PRACH as a random access code;

FIGS. 6B and 6C illustrate additional examples of access codes that may be used as part of a sector sweep PRACH;

Figure 1:
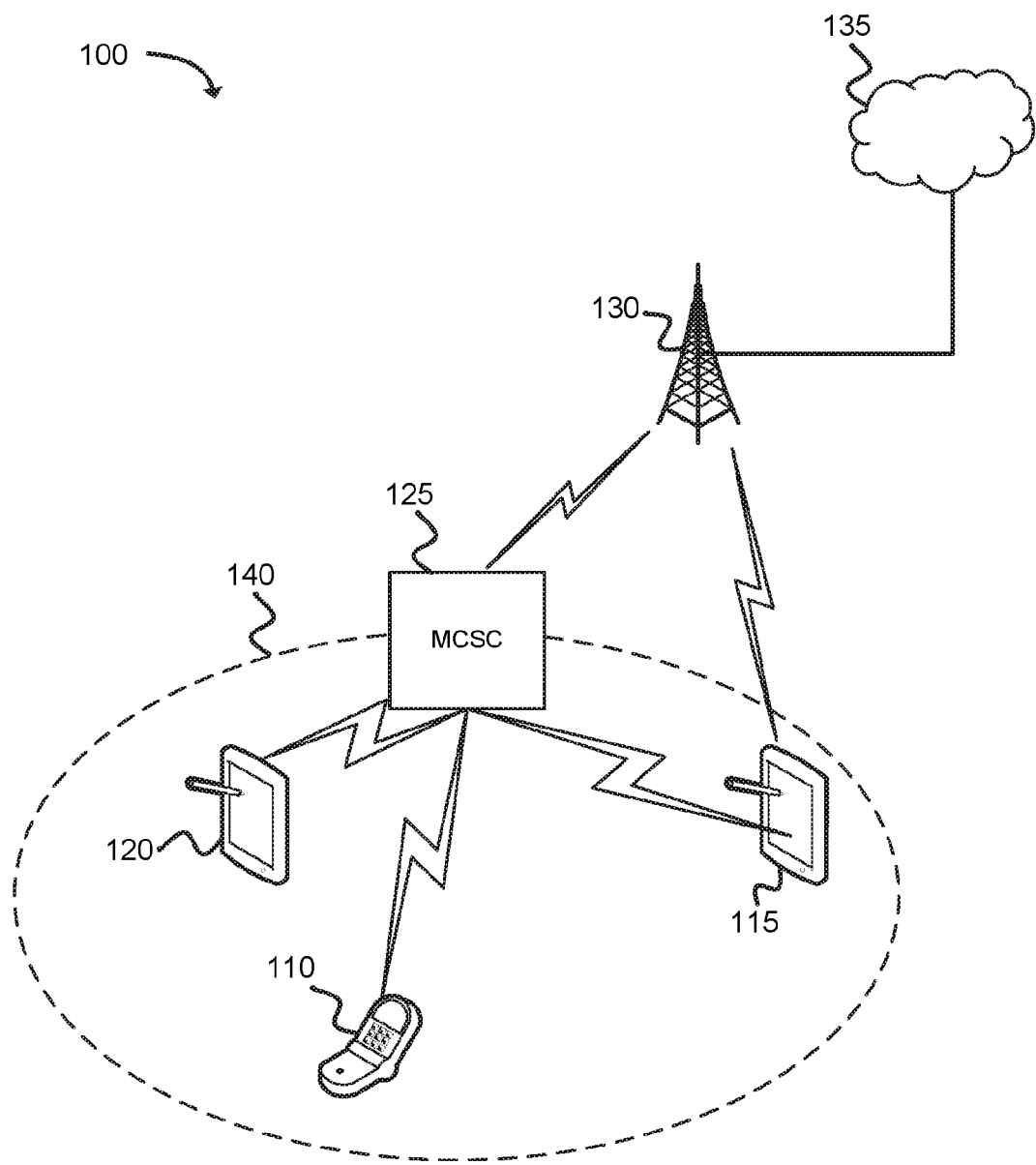
FIG. 1 illustrates a block diagram of a network including an MCSC and an eNB in accordance with an example.

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

Some examples relate to systems, methods, and computer readable media to enable a millimeter-wave (mmWave) capable small cell (MCSC) device or another small cell device to receive a handover of a user equipment (UE) from an evolved Node B (eNB). In particular, systems and methods are described for UE association with a MCSC operating as a booster for an eNB, including identification of, and communication on, a preferred cell sector (e.g., a beam sector) between the UE and the MCSC. The following description and the drawings illustrate specific examples. Other examples can incorporate structural, logical, electrical, process, and other changes. Portions and features of some examples can be included in, or substituted for, those of other examples.

In various implementations, an MCSC can work as a booster cell in an anchor-booster architecture, where the eNB offloads a portion of the traffic for a UE being managed by the eNB to the MCSC. MCSC operation as a booster cell supports highly efficient delivery of user traffic within the MCSC cell area that is a subset of the area covered by the eNB, and may enable signal quality assurance for UE during periods of high communication rates or in congested areas of eNB coverage. Such booster operation may provide particular benefits when a booster MCSC may be deployed in a different frequency band than the eNB frequency band due to relaxed interference between communication layers. An MCSC acting as a booster operating at millimeter wave frequencies may thus be a modular improvement to certain eNB systems if the UE operating within the eNB coverage area supports millimeter wave frequencies. Alternatively, an MCSC can act as a secondary carrier where a backhaul communication link is directly available to the MCSC. In both such implementations, the MCSC can be part of handover processes to manage UE communications as the UE moves.

Some examples described herein related to signal quality measurements on a sector basis (e.g., for beam sectors), association between a UE and an MCSC as part of a handover from an eNB, and coarse beamforming training. Additionally, some examples further include a high level design of primary synchronization signal (PSS)/secondary synchronization signal (SSS) sequences and physical random access channel (PRACH) sequences that are customized for the handover of the UE between the eNB and the MCSC.

FIG. 1 illustrates a wireless network 100 in accordance with some examples. The wireless network 100 can include user equipments (UEs) 110, 115, and 120. The UEs 110, 115, and 120 may be, for example, laptop computers, smart phones, tablet computers, printers, machine-type devices such as smart meters, or any other wireless device with or without a user interface. The UEs 110, 115, and 120 can have a wireless connection through a millimeter wave capable small cell 125, through an evolved Node B (eNB) 130, or through both to the wireless network 135. The eNB may be configured as a macro cell or a small cell. The wireless network 135 can represent an interconnection of a number of networks. For instance, the wireless network 135 may couple with a wide area network (WAN) such as the Internet or an intranet.

The MCSC 125 can provide communication support in a service area 140. The Service area 140 can be at least partially within an eNB service area provided by the eNB 130. The Service area 140 and the eNB service area associated with eNB 130 can each be supported by antennas integrated with the MCSC 125 and the eNB 130 for their respective service areas. The service areas can be divided into a number of beam sectors associated with certain antennas. Such beam sectors may be physically associated with fixed antennas or may be assigned to a physical area with tunable antennas or antenna settings adjustable in a beamforming process used to direct a signal to a particular beam sector. In one example, three beam sectors can each covering a 120 degree area. A respective array of antennas can be electronically or physically directed to each sector to provide 360 degree coverage around eNB 130.

The MCSC 125 can use millimeter wave signals and can use antennas that are highly directional. The MCSC 125 can use several different antennas, each of which covers a small directional arc from the location of the MCSC. Signals directed into such arcs may overlap to provide an acceptable quality level over a service area. While the service area 140 is shown as a circle, the MCSC 125 can also be structured so that the beam sectors in service area 140 may not cover an area 360 degrees around the location of the MCSC 125. The MCSC 125 may thus be configured to support directional wireless links with multiple UE devices using millimeter wave communications.

In certain embodiments, the MCSC 125 may transmit to a UE 115 using a millimeter wave channel and may receive communications back from the UE 115 on a different channel. The return channel can be the same millimeter wave channel, a different millimeter wave channel, an omnidirectional communication, or other communication not using a millimeter wave channel. In some examples, physical structures may block millimeter wave transmissions and create gaps in the service area 140 or in the eNB service area, so multiple MCSCs may be placed in different positions such that the eNB service area, the service area 140, and the service areas associated with other MCSCs will provide consistent signal coverage over a given area. In certain environments, such as multi-level buildings, this can include coverage at certain elevations in addition to ground-level coverage (which is represented two dimensionally by the service area 140).

In certain environments, the eNB 130 and the MCSC 125 may additionally operate with other signal sources, such as a wireless access point (AP) or a personal basic service set (PBSS) control point (PCP), in order to provide consistent signal coverage.

Figure 2:
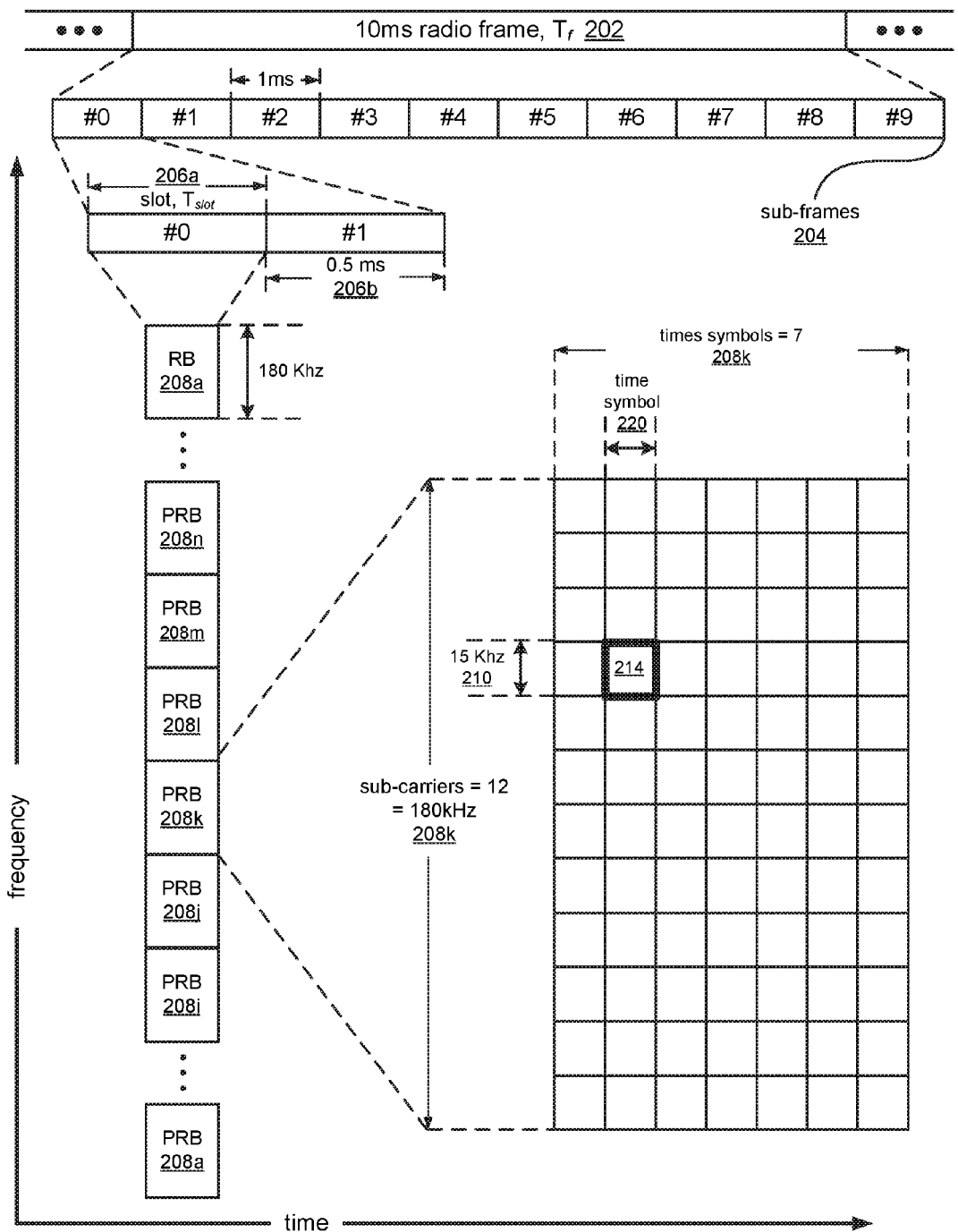
FIG. 2 illustrates a diagram of radio frame resources (e.g., a resource grid) for a downlink (DL) transmission including a legacy physical downlink control channel (PDCCH) in accordance with an example.

FIG. 2 depicts constitutive elements, with respect to time and frequency, of the Orthogonal Frequency Division Multiplexing (OFDM) transmission scheme employed by the Third Generation Partnership Project (3GPP) Long Term Evolution (LTE) standards. However, other OFDM and non-OFDM modulation schemes are possible. With respect to time in the example, a single radio frame 202, with a duration of 10 milliseconds (ms), is depicted from a stream of frames. The single radio frame comprises a set of 10 sub-frames 204, numbered from #1 to #10 in the expanded cutout of the radio frame. Each sub-frame has a duration of 1 ms. A sub-frame can be further subdivided into two slots (#0 206a, #1 206b), a slot having a duration of 0.5 ms.

The 0.5 ms duration of a slot can coincide with the temporal duration of a physical resource block (PRB) 208a-x. A PRB, as further defined in 3GPP TS 36.211, Sections 5.2.3 and 6.2.3 for 3GPP LTE release 12 (or an earlier release), can be the smallest unit of resource allocation assigned by a transmission point scheduler unit within 3GPP LTE standards. Other standards can define analogous units, for purposes of resource assignment, with respect to time and frequency. For example, a 5G radio frame may include frames and sub-frames with significantly shorter time durations. For instance, each frame in a 5G system may have a duration of 0.5 ms, 1.0 ms, 2 ms, 5 ms, or another desired time duration.

In addition to its 0.5 ms temporal span in this example, a PRB also spans a range of frequencies. Individual PRBs have distinct frequency spans, as depicted by the ascending series of PRBs with respect to frequency in FIG. 2. More specifically, an individual PRB 208a-x can include 12 different 15 kHz subcarriers 210 (on the frequency axis) and 6 or 7 time symbols 220 (on the time axis) per slot 206, per subcarrier, depending on whether a normal Cyclic Prefix (CP), 7 time symbols, or an extended CP, 6 time symbols, is used. The various subcarriers and time symbols with respect to frequency and time dimensions can create a grid of 84 Resource Elements (REs) 214, where a PRB 208k comprises 7 time symbols. In a 5G system, the PRBs may include more subcarriers, fewer subcarriers, a greater bandwidth per subcarrier, a lesser bandwidth per subcarrier, and a different CP length.

Figure 3:
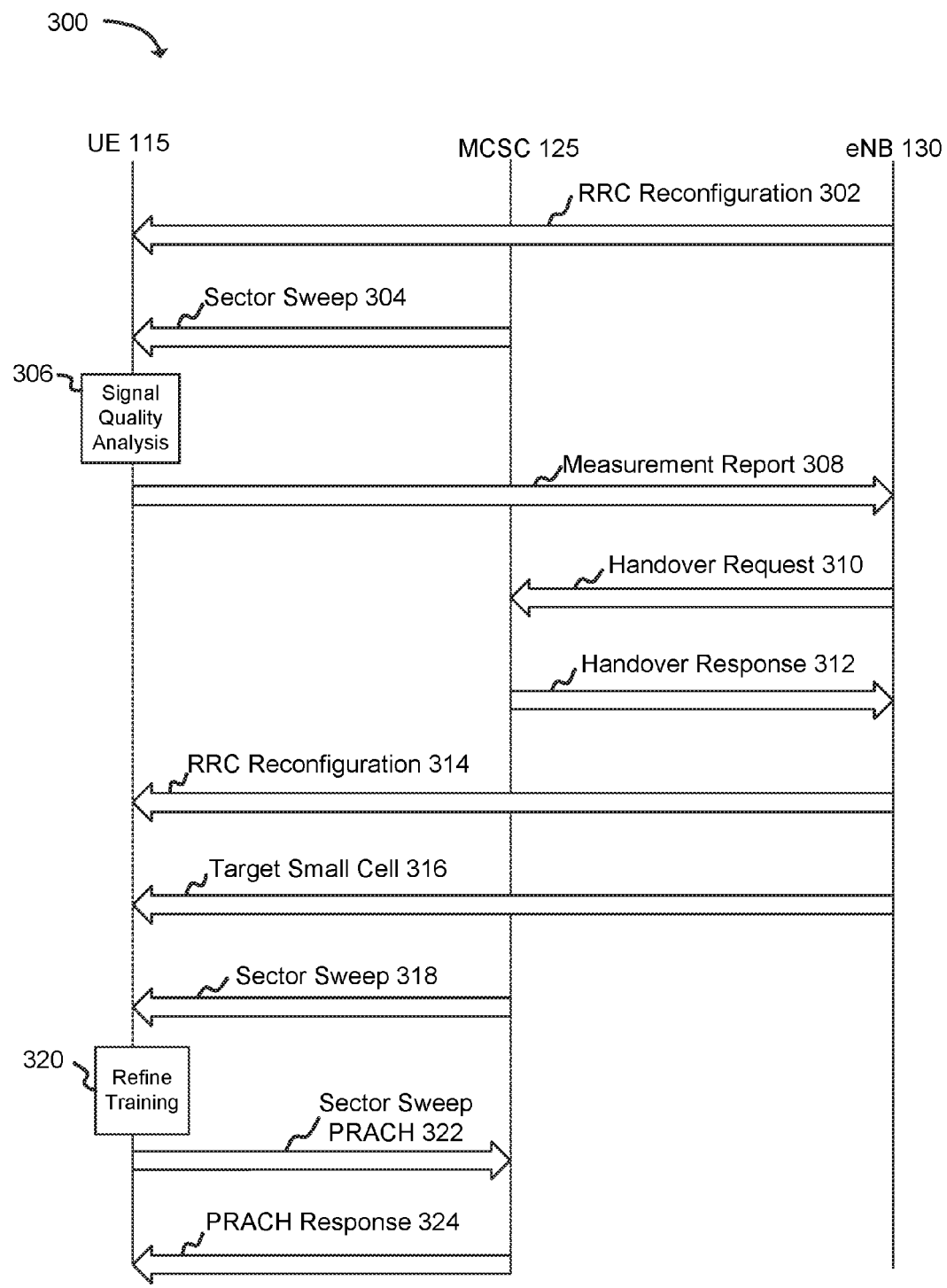
FIG. 3 illustrates example functionality 300 that includes a set of operations and communications for cell association and beamforming training with an MCSC.

FIG. 3 illustrates example functionality 300 that includes a set of operations and communications for cell association and beamforming training when channel reciprocity is assumed (e.g., in a TDD system). While the functionality 300 may be implemented using various different systems, the functionality 300 is particularly described using the elements of the network 100 from FIG. 1. The functionality 300 shows a set of operations and communications between the UE 115, the MCSC 125, and the eNB 130. The functionality can be performed sequentially with the operations proceeding from top to bottom. In alternative examples, one or more operations described herein may be performed simultaneously with similar operations being performed with other elements, such that the MCSC 125 may communicate with another UE such as UE 110 or UE 120. The eNB 130 may similarly communicate with the MCSC 125 and with another MCSC at the same time such that a system may perform aspects of the operations described by functionality 300 at the same time.

The MCSC 125 can operate as a booster cell that receives handover commands from the eNB 130. Alternatively, the MCSC 125 can work a secondary carrier instead of a booster cell such that the MCSC 125 of the network 100 includes a direct connection to the wireless network 135. In examples wherein the MCSC 125 works as a secondary carrier, the eNB 130 can use activation/de-activation procedures instead of handover procedures to enable the UE 115 to use the MCSC 125 for wireless traffic.

The functionality 300 can begin with a radio resource control (RCC) reconfiguration operation 302 which can serve as a measurement request made by the eNB 130 and communicated to the UE 115. This may be similar to a standard Long-Term Evolution (LTE) RCC reconfiguration using a "measConfig" operation.

Figure 4A:
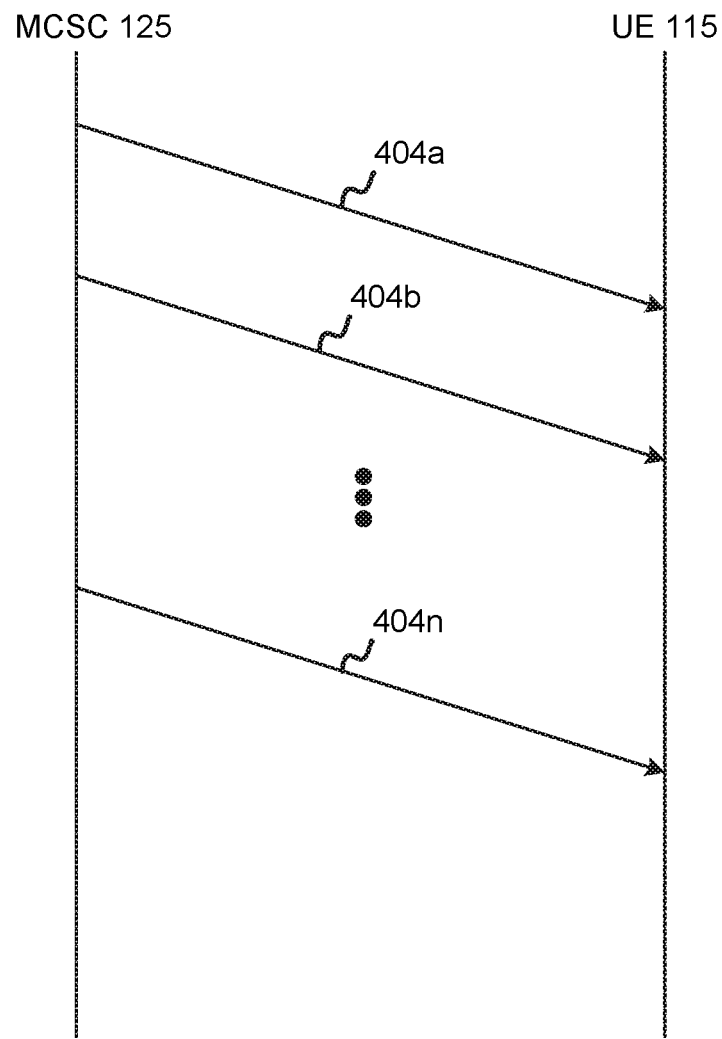
FIG. 4A describes aspects of one example of MCSC synchronization signals that can be communicated to a plurality of beam sectors.

FIG. 4A describes aspects of one example of MCSC synchronization signals 404 that can be communicated to a plurality of beam sectors. The synchronization signals 404 can include a signal communicated to a first beam sector as synchronization signal 404a, to a second beam sector as synchronization signal 404b, to an Nth sector as synchronization signal 404n, and so on. Such signals may be received by the UE 115 and by other UEs within a signal area covered by a synchronization signal sent to a particular beam sector. In some examples, some of the synchronization signals of the synchronization signals 404 may not be received by the UE 115, but at least one signal of synchronization signals 404 is received by UE 115.

In one example comprising a frame structure, multiple continuous symbols may be used as part of the MCSC synchronization signals 404, with a primary synchronization signal (PSS) and a secondary synchronization signal (SSS.) Such a system may operate using a PSS code space that is expanded from a standard three sector LTE code space to a multiple sector design. For example, an expanded PSS code space can include space for 8 sectors or 16 sectors. To enable efficient detection of the PSS, the PSS sequence within an individual synchronization signal of MCSC synchronization signals 404 may have an internally repetitive pattern.

For example, one example of a PSS sequence can be placed at every odd tone or every even tone in a frequency domain, resulting in a time-domain repetition and allowing auto-correlation for timing acquisition and frame boundary detection. Cross-correlation may then be applied by a detector to detect a sector identifier. The SSS, which includes the cell identifier, may follow a similar design with coherent detection enabled by the design of the SSS. The detailed sequence of PSS and SSS elements of a synchronization signal may be set based on the bandwidth of the MCSC system and the sampling rate and symbol duration of a system in which the MCSC 125 operates. Such a detailed sequence may also be set based on the number of sectors used by MCSC 125.

Figure 5:
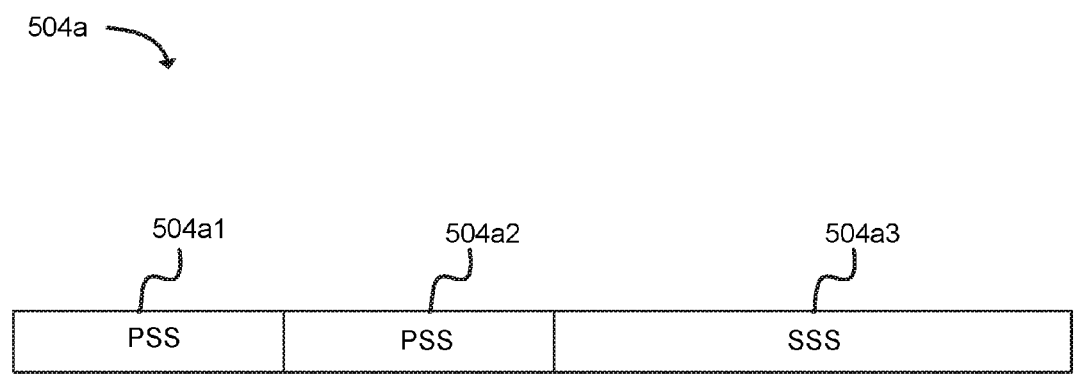
FIG. 5 illustrates an example of a MCSC synchronization signal.

FIG. 5 illustrates one example of an MCSC synchronization signal 504a. In certain implementations of MCSC synchronization signals 404, MCSC synchronization signal 404a can be similar to MCSC synchronization signal 504a. MCSC synchronization signal 504a can include two PSS communications shown as first PSS 504a1 and second PSS 504a2. Second PSS 504a2 can be followed by a single SSS 504a3. MCSC synchronization signal 504a can then be followed by other MCSC synchronization signals as part of a sector sweep using MCSC synchronization signals with each MCSC synchronization signal having the two PSS/one SSS synchronization signal structure.

The operation for signal quality analysis 306, as shown in FIG. 3, includes reception of one or more MCSC synchronization signals 404, such as MCSC synchronization signal 404a, and performance of a signal quality analysis by the UE 115 on each received MCSC synchronization signal. The signal quality can be based, at least in part, on a received signal strength indication (RSSI), a reference signal received power (RSRP), a reference signal received quality (RSRQ) value of the first synchronization signal for each sector of the plurality of sectors, or any combination of these or other values determined from the received MCSC synchronization signals 404. UE 115 then selects a sector based on the quality analysis. In one example, the UE 115 can determine a quality value for each sector of the plurality of sectors as a function the RSSI, the RSRP, and the RSRQ, determine a best quality value from the quality value for each sector of the plurality of sectors, and select a sector associated with the best quality value as the first sector. This can, for example, be a largest or smallest quality value selected from the quality values for the sectors.

The measurement report 308, as shown in FIG. 3, is an operation where the UE 115 communicates the results of the quality analysis performed as part of the signal quality analysis 306. The measurement report 308 can include quality numbers for each sector by, for example, sending an RSSI value, an RSRP value, or an RSRQ value for each sector. The measurement report 308 may alternatively send another value such as a calculated quality value that is a function of such quality numbers.

The eNB 130 may then receive the information from the measurement report 308 and use this information to make a handover decision. This handover decision may be based on quality analysis thresholds, based on a comparison with similar quality analysis numbers associated with signals from the eNB 130 to the UE 115, or based on any other handover-decision criteria. Such handover decisions may be based on existing LTE handover standards between eNBs or may be based on handover processes customized for MCSC operations. Additionally, the handover decisions may vary depending on whether the MCSC 125 is operating as a booster for the eNB 130 or whether the MCSC 125 is operating as an independent cell.

When the eNB 130 determines that UE 115 will be passed to the MCSC 125 from the eNB 130, the eNB 130 can perform a handover hand shake with the MCSC 125. This handover process, as shown by functionality 300, includes a handover request 310 including a communication from the eNB 130 to the MCSC 125, a handover response 312 communication from the MCSC 125, and an RRC reconfiguration 314 communication from the eNB 130 to the UE 115.

After this initial portion of the handover, the target small cell operation 316 involves a communication of applicable handover information from the eNB 130 to the UE 115. This handover information can include a master information block (MIB) and a physical random access channel (PRACH) code via a physical shared downlink channel (PDSCH) or any available communication link. The handover information can also include system information blocks (SIGs), the sector identified by the signal quality analysis 306, and any other such handover information.

The sector sweep 318 can be a continuation of the transmission of MCSC synchronization signals 404 sent by the MCSC 125. These additional repetitions of MCSC synchronization signals 404 can then be received by the UE 115. The refine training 320 is an operation that can then be performed by the UE 115 using the portion of the MCSC synchronization signals 404 received by the UE 115 from the sector sweep 318 to perform timing acquisition. The timing acquisition performed by the UE 115 can use PSS portions of individual MCSC synchronization signals, such as MCSC synchronization signal 404b, along with the handover information received as part of the target small cell operation 316. The refine training 320 may additionally involve a repeat of the signal quality analysis 306 to determine if a new sector is associated with the best signal quality. In some examples, if a UE is not moving and an elapsed time between the sector sweep 304 and the sector sweep 318 is small, the UE 115 may determine that the refine training 320 is not needed and the refine training 320 may not be performed. This determination may be based on a threshold setting stored in the UE 115 and associated with movement of the UE 115 and an elapsed time between receipt of MCSC synchronization signals in the sector sweep 304 and the sector sweep 318.

Figure 4B:
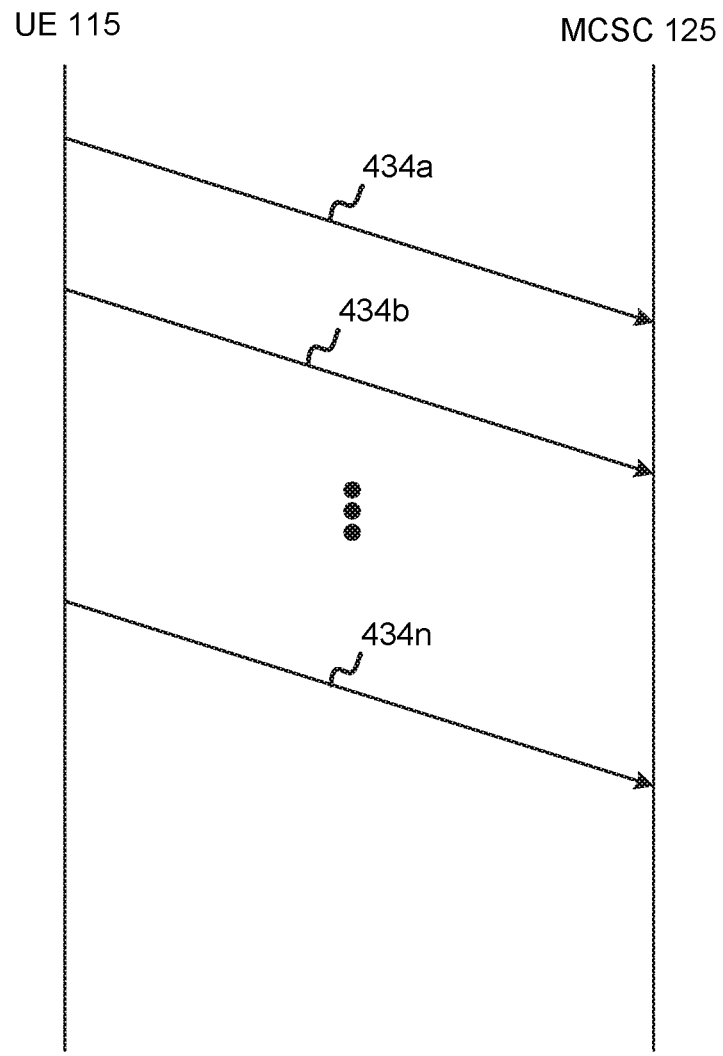
FIG. 4B describes an example of UE synchronization signals sent by a UE in a plurality of sectors.

The operation for the sector sweep PRACH 322 is then part of a reverse training from the UE 115 to the MCSC 125. As part of this reverse training, the UE 115 sends the access codes received as part of handover information from the target small cell operation 316. This includes an access code for each sector as shown by FIG. 4B, such that the UE 115 sends a sector 1 random access code 434a, a sector two random access code 434b, a sector n random access code 434n, and so on. In various examples, this may be a PRACH code which may be modified from a standardized base of 64 random access codes in a variety of ways, as illustrated by FIGS. 6A-6C. FIG. 4B thus shows UE synchronization signals sent by the UE 115 in a first plurality of sectors, where FIG. 4A shows MCSC synchronization signals sent in a separate second plurality of sectors.

FIG. 6A illustrates an example of an access code that may be used as part of the sector sweep PRACH 322 as the random access code 610. The random access code 610 can be one access code from a set of expanded PRACH codes, with the set comprising 64 codes times the number of sectors used by the MCSC 125. For example, if the MCSC 125 uses 10 sectors, the set of expanded PRACH codes of which the random access code 610 is a part would include 640 different access codes. If the MCSC 125 uses 4 sectors, the set of expanded PRACH codes of which the random access code 610 is a part would include 256 different access codes.

FIGS. 6B and 6C illustrate additional examples of access codes that may be used as part of the sector sweep PRACH 322. The random access code 620 includes a standard PRACH code followed by sector information. The set of PRACH codes of which random access code 620 is a part would include the same number of different random access codes as the set of PRACH codes of which random access code 610 is a part, but would simply include the sector information as part of the code rather than 64 unique random codes for each sector. The random access code 630 is an example of sector information that may be included in a random access code when the refine training 320 determines that the UE 115 has moved and a new best sector different from the best sector determined with the signal quality analysis 306 is associated with the new UE position. The random access code 330 thus includes a sector instead of merely including sector identification information. The random access code 630 can therefore include not only a PRACH code, but also reverse direction training information and beamforming training acknowledgment information.

After the sector sweep PRACH 322 operation can complete communication of the random access codes 434 as illustrated by FIG. 4B, the MCSC 125 can send a random access response including a cell radio network temporary identifier (C-RNTI) and a timing advance (TA) command as part of a PRACH response 324. Additionally, the MCSC 125 may analyze the random access codes 434 that were received by the MCSC 125 from the sector sweep PRACH 322, and the MCSC 125 can determine a best sector based on the random access codes 434 communicated in different sectors. This may use a signal quality analysis performed by the MCSC 125 that is similar or identical any sector analysis described above for the signal quality analysis 306. This may also involve additional or alternative different analysis of the sectors used for the random access codes 434.

In comparison with similar beamforming procedures that can be applied in frequency division duplexing (FDD), the functionality 300, which is applied in a time division duplexing (TDD) system that has channel reciprocity, obviates the need for transmission (Tx) and reception (Rx) beamforming vectors to be trained separately and obviates the need for feedback to complete the beamforming training protocol at the UE.

As discussed above, functionality 300 is directed to an example with the MCSC 125 operating as a booster for the eNB 130. In an alternate embodiment with an MCSC such as the MCSC 125 working as a secondary carrier instead of a booster cell, the eNB 130 may use activation/deactivation procedures instead of handover procedures to enable a UE such as the UE 115 to use the MCSC 125 for wireless traffic. In such embodiments, the handover request 310 and the handover response 312 may be replaced or enhanced with activation and deactivation actions directed to the MCSC 125, with the MCSC 125 responsive to such activation and deactivation commands from the eNB 130.

Figure 7:
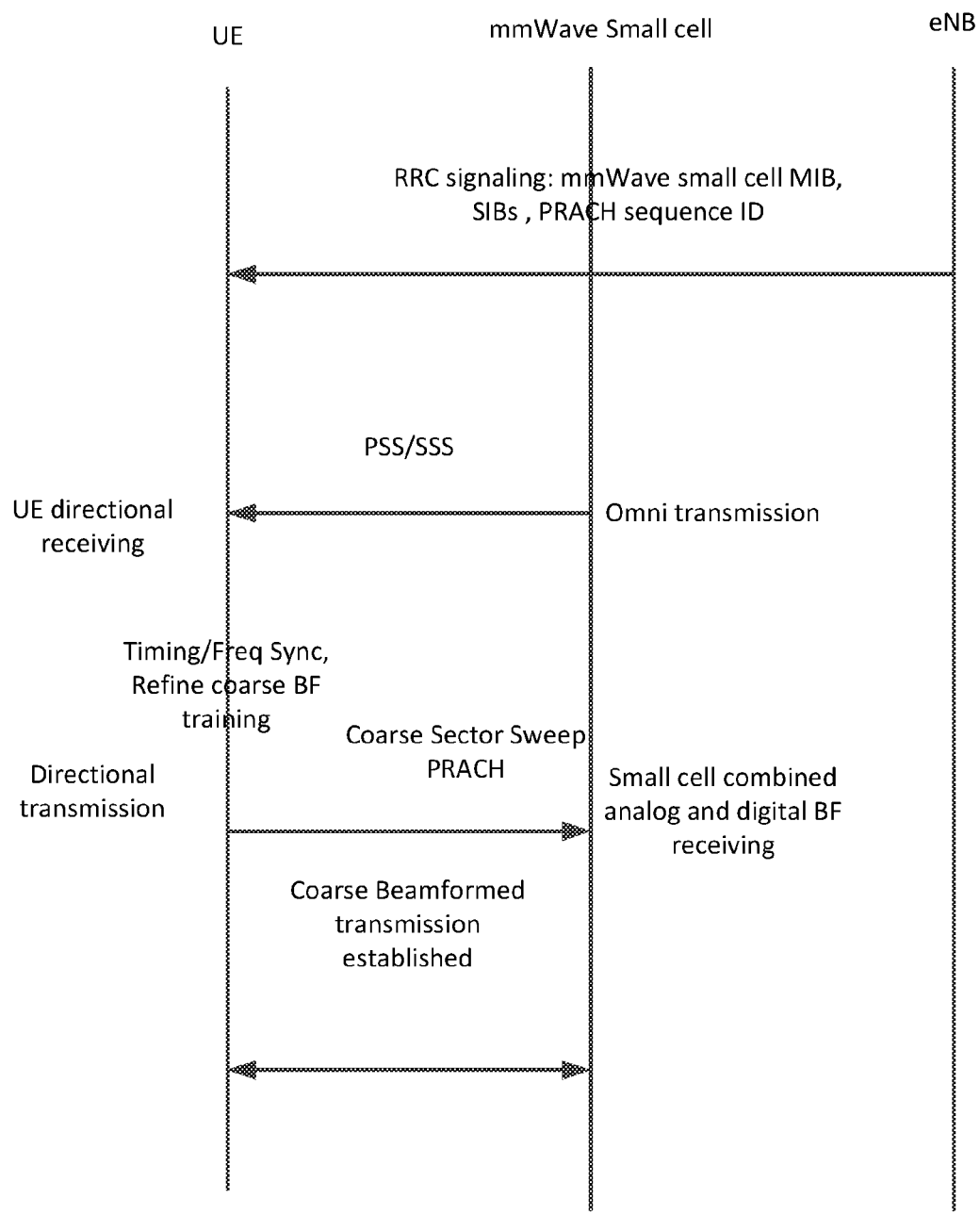
FIG. 7 illustrates achieving downlink (DL) synchronization between a user equipment (UE) and a mmWave enhanced Node B (eNB) configured for time division duplexing (TDD) in accordance with an example.

FIG. 7 illustrates achieving downlink (DL) synchronization between a user equipment (UE) and a mmWave enhanced Node B (eNB) configured for time division duplexing (TDD) in accordance with an example. As shown in FIG. 7, an anchor eNB can provide a UE with relevant parameters that can be used for DL synchronization between the UE and the mmWave eNB. In one embodiment, the parameters can be communicated using radio resource control (RRC) signaling. Alternatively, the relevant parameters, or a portion of the relevant parameters that are common to a plurality of UEs, may be broadcast from the anchor eNB to the plurality of UEs. Some examples of parameters that can be received in the RRC messaging or in broadcast messaging include: access sequence identification (ID), format ID, resource allocation, master information blocks (MIBs), system information blocks (SIBs), transmit power related parameters, number of repeats, and random access response related parameters.

The mmWave eNB can send a synchronization signal, which can include one or more Primary Synchronization Signals (PSSs) and one or more Secondary Synchronization Signals (SSSs), to the UE one or more times in an omnidirectional fashion. Specifically, the mmWave eNB can send the synchronization signal in an omnidirectional fashion at least once for every directional beam (e.g., as defined in a beam codebook used by the mmWave eNB). There can be, for example, 8 beam sectors, 16 beam sectors, or some other number of beam sectors. The UE can then perform a beam scan by attempting to perform directional reception of the synchronization signal in each beam direction. The UE can perform a signal quality analysis in order to identify a preferred beam sector and/or direction. The UE can also synchronize downlink (DL) time/frequency using the synchronization signals (PSS and SSS). In one example, the existing design for the PSS (e.g., a complex Zadoff-Chu sequence of length 62 symbols) and the SSS in 3GPP LTE Rel. 12 can be used.

Information obtained from the DL synchronization can be used to perform a directional uplink transmission. At this point, the DL time, frequency and coarse beam synchronization can be achieved using the PSS/SSS signaling from mmWave eNB. It should be noted that DL random access signal can be received first at the UE. As such, the UE can then transmit the UL random access signal in the direction of the DL random access signal (e.g., directional transmission of the RACH signal by the UE with one or more repetitions).

Figure 8:
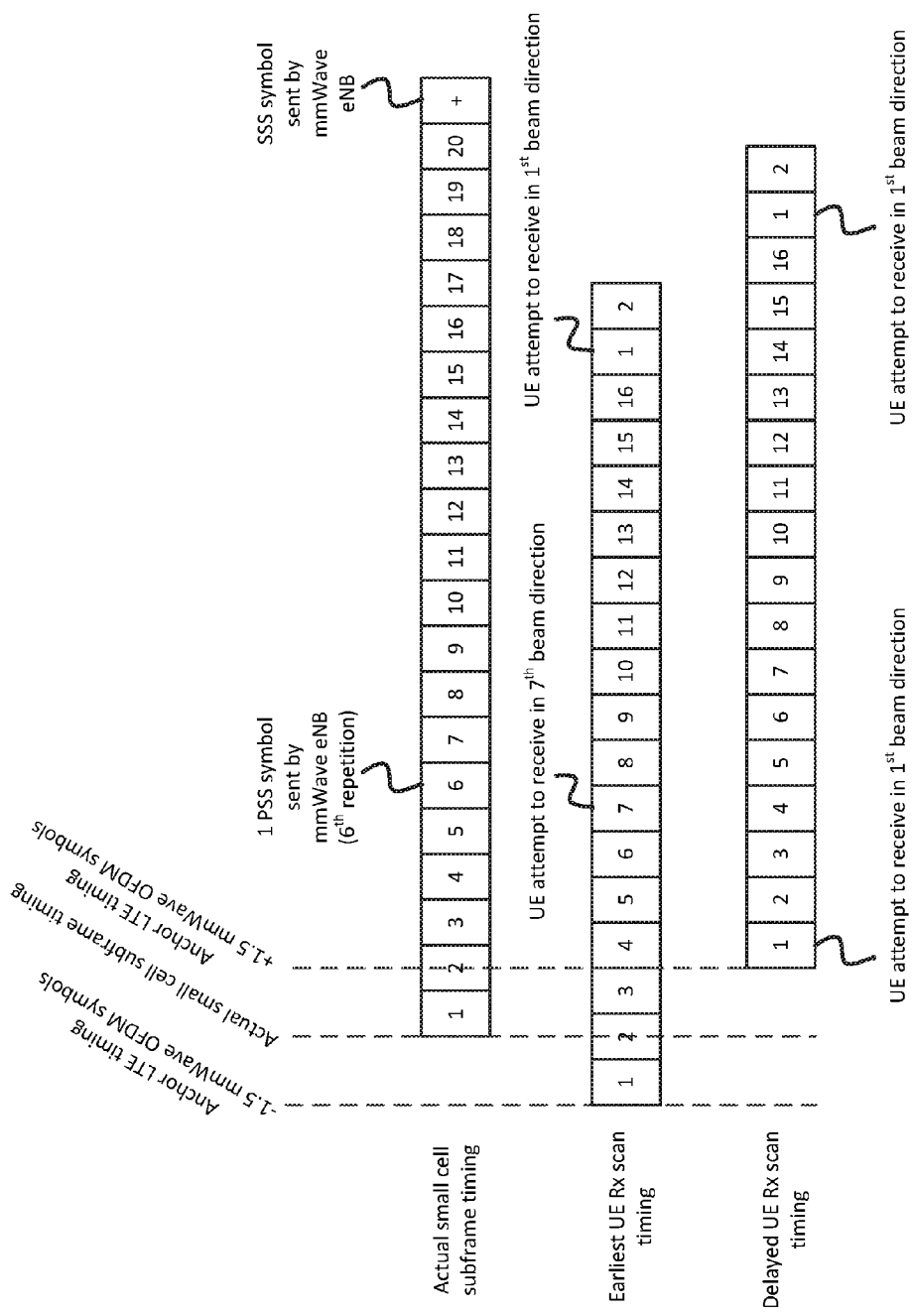
FIG. 8 illustrates an example of a sub-frame design (design option 1) that an mmWave eNB can use for the repeated omnidirectional transmission of PSS/SSS symbols.

FIG. 8 illustrates an example of a sub-frame design (design option 1) that a mmWave eNB can use for the repeated omnidirectional transmission of PSS/SSS symbols.

As shown in FIG. 8, the mmWave eNB can send one PSS symbol for each of 16 beam sectors (though other numbers of beam sectors are possible in other examples). The UE can perform a beam scan for each of the 16 beam sectors wherein directional reception is attempted in each of 16 beam directions corresponding to the 16 beam sectors. In addition, the mmWave eNB can transmit the PSS several more times (e.g., shown as repetitions 17-20) in order to account for misalignment between the timing of an anchor eNB and the mmWave eNB. Hence, the PSS is repeated a total of 20 times. In this example, the maximum timing difference between DL signals from the anchor eNB and the mmWave eNB is assumed to be 1.5 mmWave OFDM symbols. As shown, the UE can perform additional beam scans for beam sectors 1 and 2 in order to account for the timing misalignment. An SSS symbol can be transmitted in order to signify the end of the sub-frame after the PSS symbols are transmitted.

Figure 9:
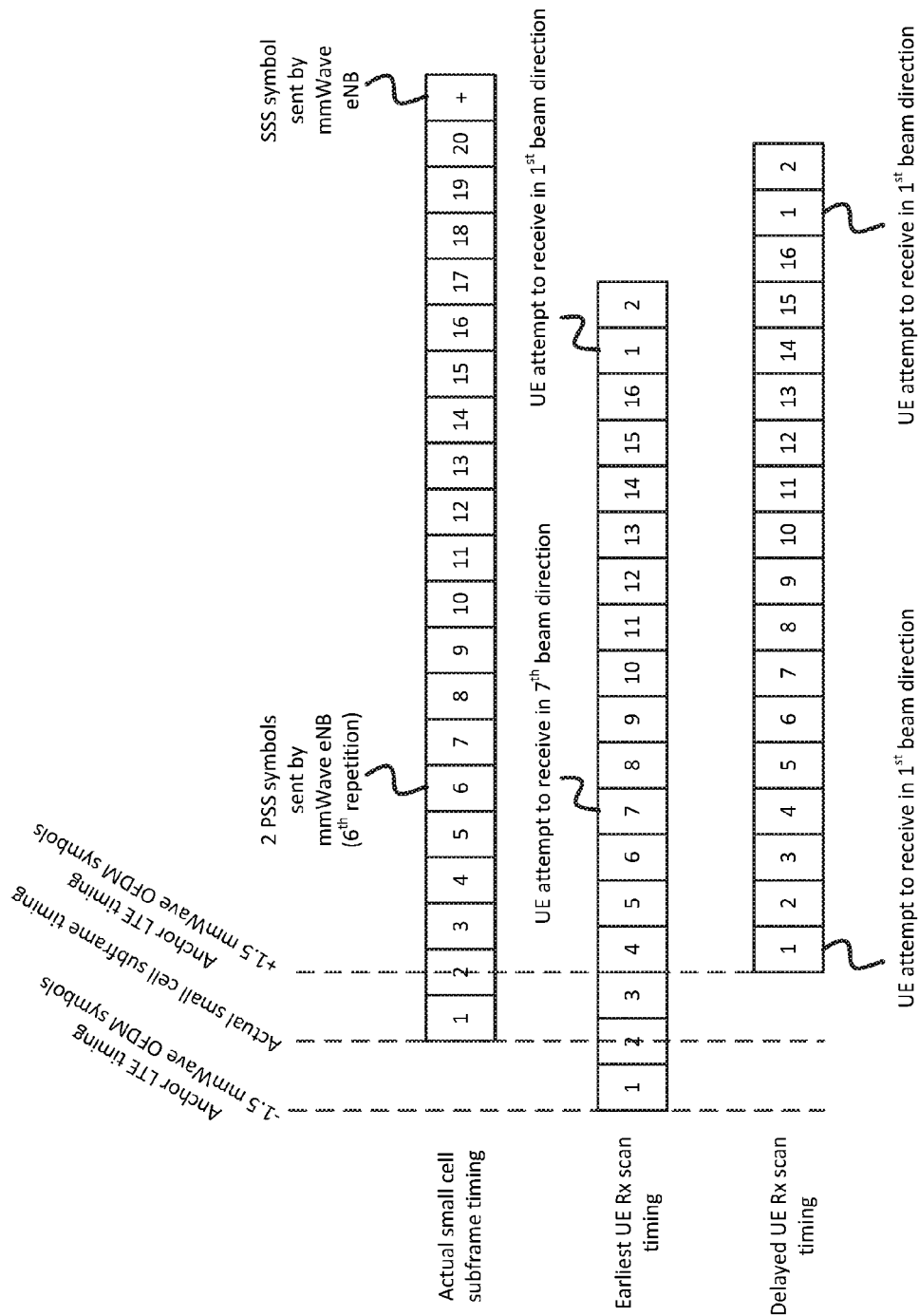
FIG. 9 illustrates another example of a sub-frame design (design option 2) that an mmWave eNB can use for the repeated omnidirectional transmission of PSS/SSS symbols.

FIG. 9 illustrates another example of a sub-frame design (design option 2) that an mmWave eNB can use for the repeated omnidirectional transmission of PSS/SSS symbols. As shown in FIG. 9, the mmWave eNB can send two PSS symbols for each of 16 beam sectors (though other numbers of beam sectors are possible in other examples). The UE can perform a beam scan for each of the 16 beam sectors wherein directional reception is attempted in each of 16 beam directions corresponding to the 16 beam sectors. In addition, the mmWave eNB can transmit the two PSSs per beam sector several more times (e.g., shown as repetitions 17-20) in order to account for misalignment between the timing of an anchor eNB and the mmWave eNB. Hence, the PSS may be repeated a total of 40 times. In this example, the maximum timing difference between DL signals from the anchor eNB and the mmWave eNB is assumed to be 3 mmWave OFDM symbols. As shown, the UE can perform additional beam scans for beam sectors 1 and 2 in order to account for the timing misalignment. An SSS symbol can be transmitted in order to signify the end of the sub-frame after the PSS symbols are transmitted.

Figure 10:
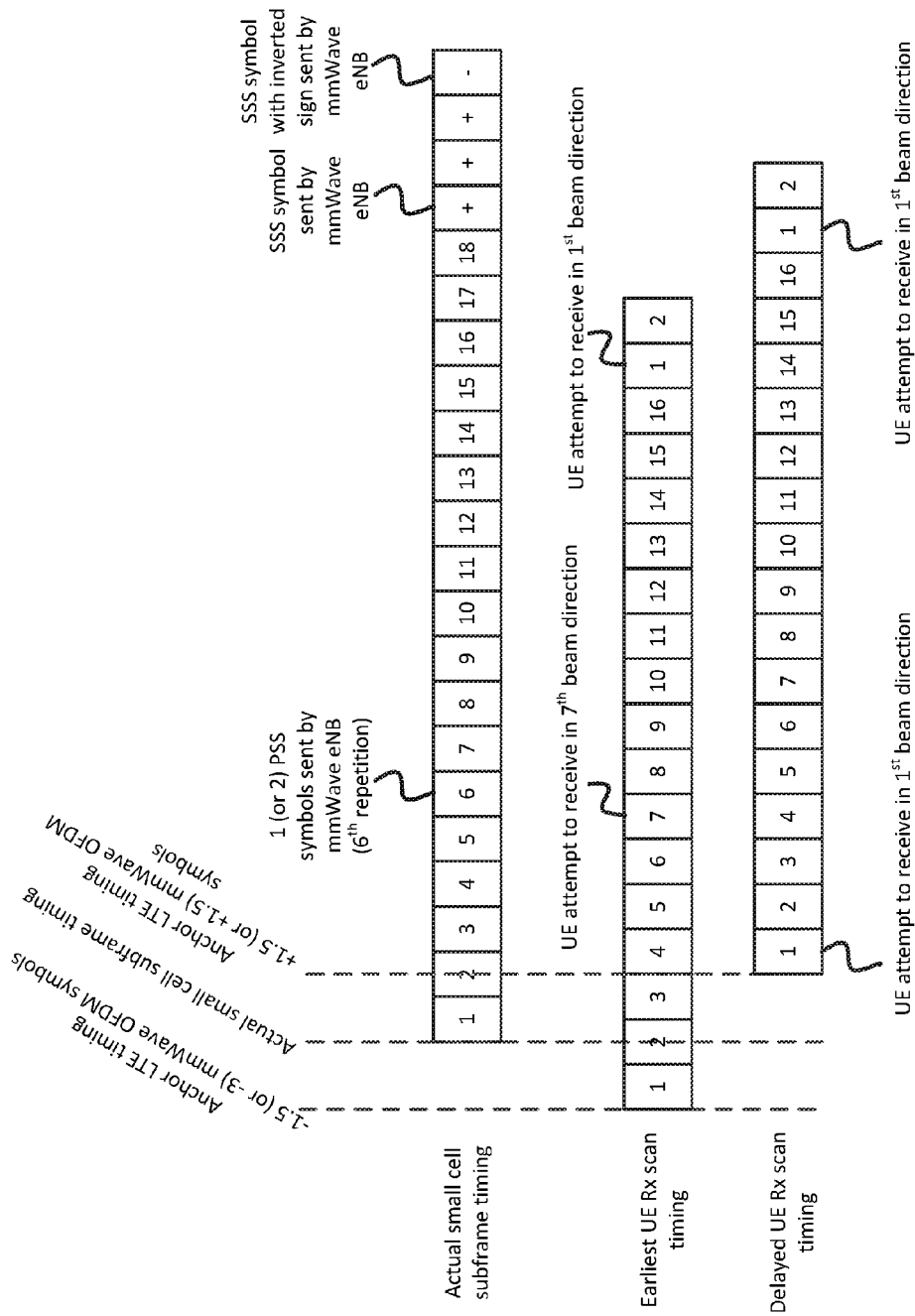
FIG. 10 illustrates another example of a sub-frame design (design option 3) that an mmWave eNB can use for the repeated omnidirectional transmission of PSS/SSS symbols.

FIG. 10 illustrates another example of a sub-frame design (design option 3) that an mmWave eNB can use for the repeated omnidirectional transmission of PSS/SSS symbols. As shown in FIG. 10, the mmWave eNB can send one (or two) PSS symbol(s) for each of 16 beam sectors (though other numbers of beam sectors are possible in other examples). The UE can perform a beam scan for each of the 16 beam sectors wherein directional reception is attempted in each of 16 beam directions corresponding to the 16 beam sectors. In addition, the mmWave eNB can transmit the one (or two) PSS(s) per beam sector several more times (e.g., shown as repetitions 17-18) in order to account for misalignment between the timing of an anchor eNB and the mmWave eNB. Hence, the PSS is repeated a total of 18 (or 36) times. In this example, the maximum timing difference between DL signals from the anchor eNB and the mmWave eNB is assumed to be 1.5 (or 3) mmWave OFDM symbols. As shown, the UE can perform additional beam scans for beam sectors 1 and 2 in order to account for the timing misalignment. A plurality of SSS symbols (e.g., four SSS symbols) can be transmitted after the PSS symbols are transmitted. As shown in FIG. 10, the last SSS symbol can have an inverted sign in order to signify the end of the sub-frame.

In some examples, the mmWave eNB may refrain from multiplexing other data with the PSS/SSS transmissions so that transmit power is concentrated on only the subcarriers that carry the synchronization data. This approach can result in increased power gain per used tone.

In the examples of FIGS. 8-10, the UE receiver can switch the beam that is being scanned each time a predefined time interval passes. The predefined time interval can be equal to a fixed number of mmWave OFDM symbol durations. This fixed number of OFDM symbol durations can vary depending on the UEs own capabilities and on the number of times the transmitting mmWave eNB repeats each PSS symbol. For example, in the design of FIG. 8, if the UE is capable of scanning 16 distinct beams, the UE can switch the beam being scanned after every 1 OFDM symbol duration. If the UE keeps the Rx beam being scanned constant over only one PSS symbol duration, the UE can perform correlation with circular shifts to compensate for the fact that the UE may commence receiving a PSS symbol from an arbitrary shifted location. In the design of FIG. 9, where 2 PSS symbols are transmitted by the mmWave eNB for every beam direction (or if the UE capability limits the number of beam scans), the additional PSS symbols can be used for noise averaging in order to improve the detection performance for the DL timing and beam direction.

In addition, in the examples of FIGS. 8-10, the number of beam sectors to be scanned, the number of PSS symbols transmitted per beam sector, and the use of an SSS with an inverted sign can be cell specific or can be configured using radio resource control (RRC) signaling.

Figure 11:
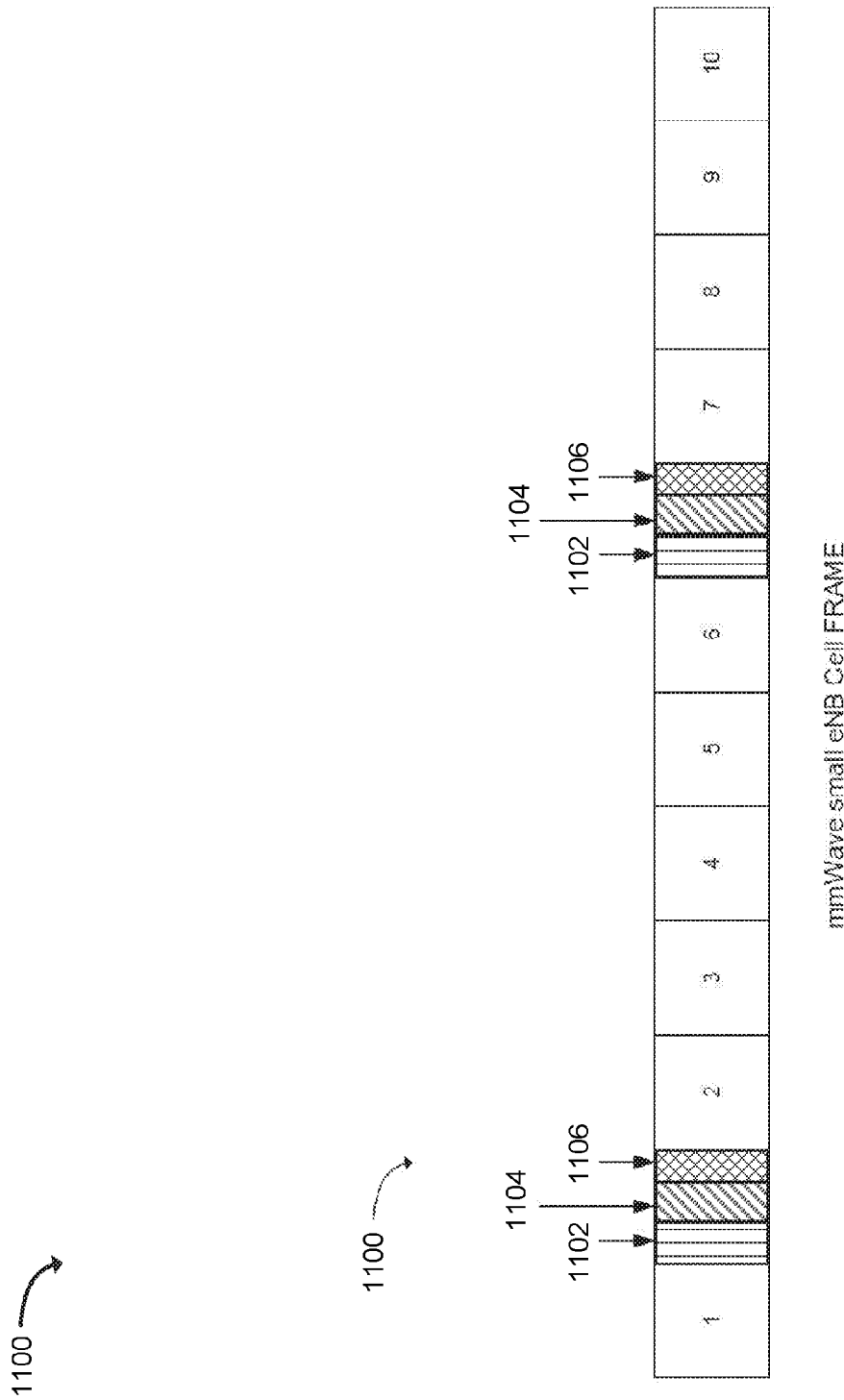
FIG. 11 illustrates a time division duplex (TDD) mmWave eNB cell frame exploiting a directional beam duality in a downlink (DL) and uplink (UL) channel in a time division duplexing (TDD) mmWave eNB system in accordance with an example.

FIG. 11 illustrates a time division duplex (TDD) mmWave eNB cell frame 1100 exploiting a directional beam duality in a downlink (DL) and uplink (UL) channel in a time division duplexing (TDD) mmWave eNB system. In FIG. 11, the RACH resource 1106 for the RACH signal can be immediately allocated following the primary synchronization signals (PSS) 1102 and the secondary synchronization signals (SSS) 1104. The mmWave eNB transmission cell frame 1100 can include 10 sub-frames listed 1-10.

For example, in operation, there is a DL sub-frame 1 transmitted by an mmWave eNB that ends with a PSS transmission 1102 and an SSS transmission 1104. Using the PSS transmission 1102 and the SSS transmission 1104, the UE can achieve a DL time synchronization and also acquire the knowledge of the receive beam direction. Next, the UE can send one or more directional transmissions of the RACH resource 1106 (e.g., the RACH signal) in one direction to enable the mmWave eNB to perform receive beamforming. In other words, the multiple repeats of the RACH signal occur in the RACH resource 1106 following the PSS transmission 1102 and the SSS transmission 1104, which enables the UE to identify a transmission direction for communication with the mmWave eNB based on a downlink synchronization of the UE with the mmWave eNB. This pattern is also observed, by way of example only, following sub-frame 6 of the mmWave eNB cell frame 1100.

Figure 12:
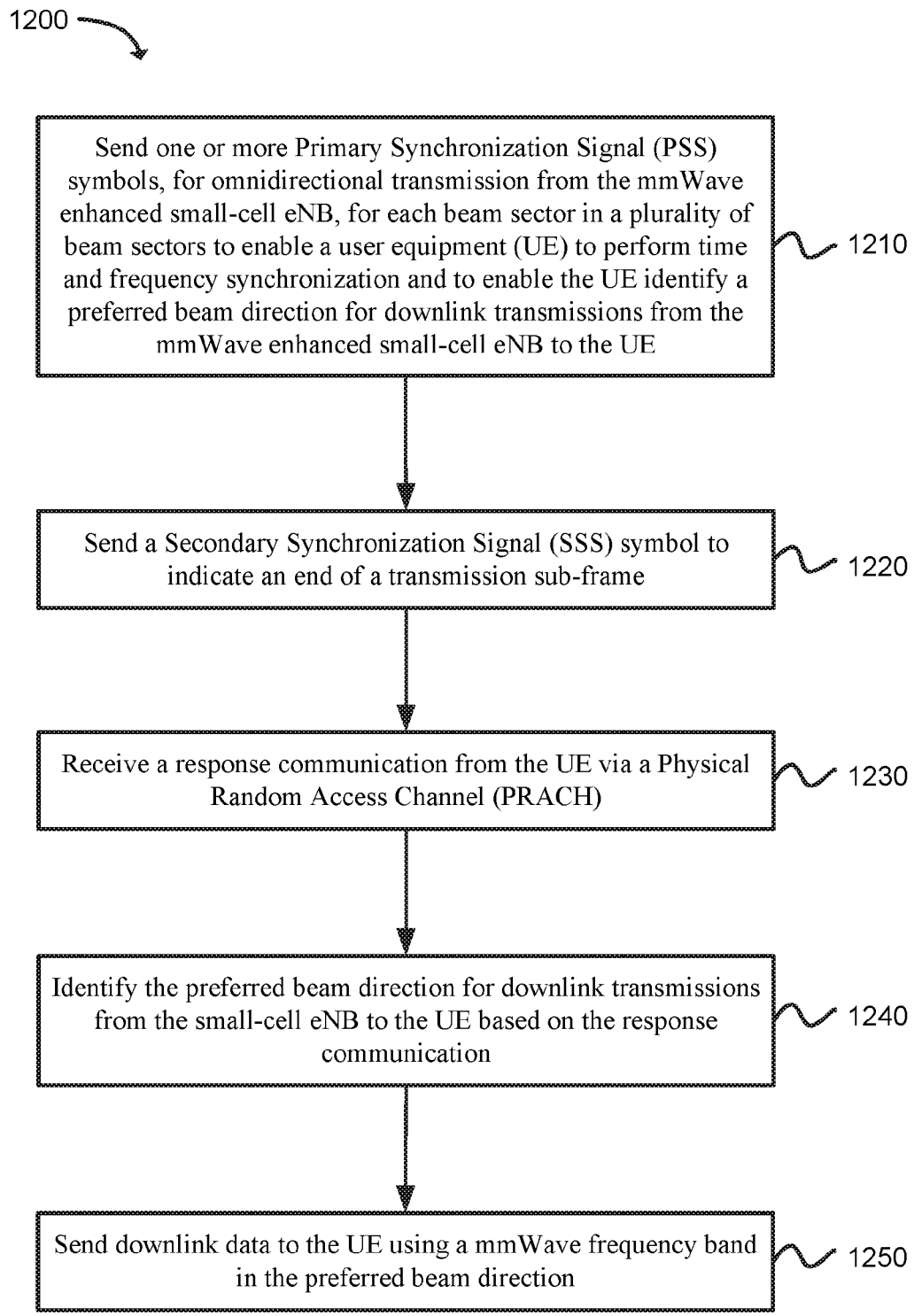
FIG. 12 illustrates functionality of a millimeter-wave (mmWave) enhanced small-cell evolved Node B (eNB) configured for Time Division Duplexing (TDD) in an anchor-boosted cellular network in accordance with an example.

FIG. 12 illustrates functionality 1200 of a millimeter-wave (mmWave) enhanced small-cell evolved Node B (eNB) configured for Time Division Duplexing (TDD) in an anchor-boosted cellular network in accordance with an example. The functionality 1200 can be implemented as a method or the functionality can be executed as instructions on a machine (e.g., by one or more processors), where the instructions are included on at least one non-transitory computer-readable storage medium.

As in block 1210, one or more processors and memory at the mmWave enhanced small-cell eNB can be configured to send one or more Primary Synchronization Signal (PSS) symbols, for omnidirectional transmission from the mmWave enhanced small-cell eNB, for each beam sector in a plurality of beam sectors to enable a user equipment (UE) to perform time and frequency synchronization and to enable the UE identify a preferred beam direction for downlink transmissions from the mmWave enhanced small-cell eNB to the UE. The plurality of beam sectors includes sixteen beam sectors or another number of beam sectors (e.g., 8 or 32). In some examples, two PSS symbols can be sent for each beam sector in the plurality of beam sectors In addition, one or more additional PSS symbols can be sent before in order to enable the UE to account for a timing misalignment between downlink transmissions from the mmWave enhanced small-cell eNB and an anchor eNB. In some examples, the timing misalignment can be less than or equal to 1.5 mmWave Orthogonal Frequency Division Multiplexing (OFDM) symbols or 3 mmWave OFDM symbols.

As in block 1220, the one or more processors and memory at the mmWave enhanced small-cell eNB can be configured to send a Secondary Synchronization Signal (SSS) symbol to indicate an end of a transmission sub-frame. In some examples, a plurality of SSS symbols can be sent, and wherein a last SSS symbol in the plurality of SSS symbols sent can include an inverted sign in order to indicate the end of the transmission sub-frame.

As in block 1230, the one or more processors and memory at the mmWave enhanced small-cell eNB can be configured to receive a response communication from the UE via a Physical Random Access Channel (PRACH).

As in block 1240, the one or more processors and memory at the mmWave enhanced small-cell eNB can be configured to identify the preferred beam direction for downlink transmissions from the small-cell eNB to the UE based on the response communication.

As in block 1250, the one or more processors and memory at the mmWave enhanced small-cell eNB can be configured to send downlink (DL) data to the UE using a mmWave frequency band in the preferred beam direction.

Figure 13:
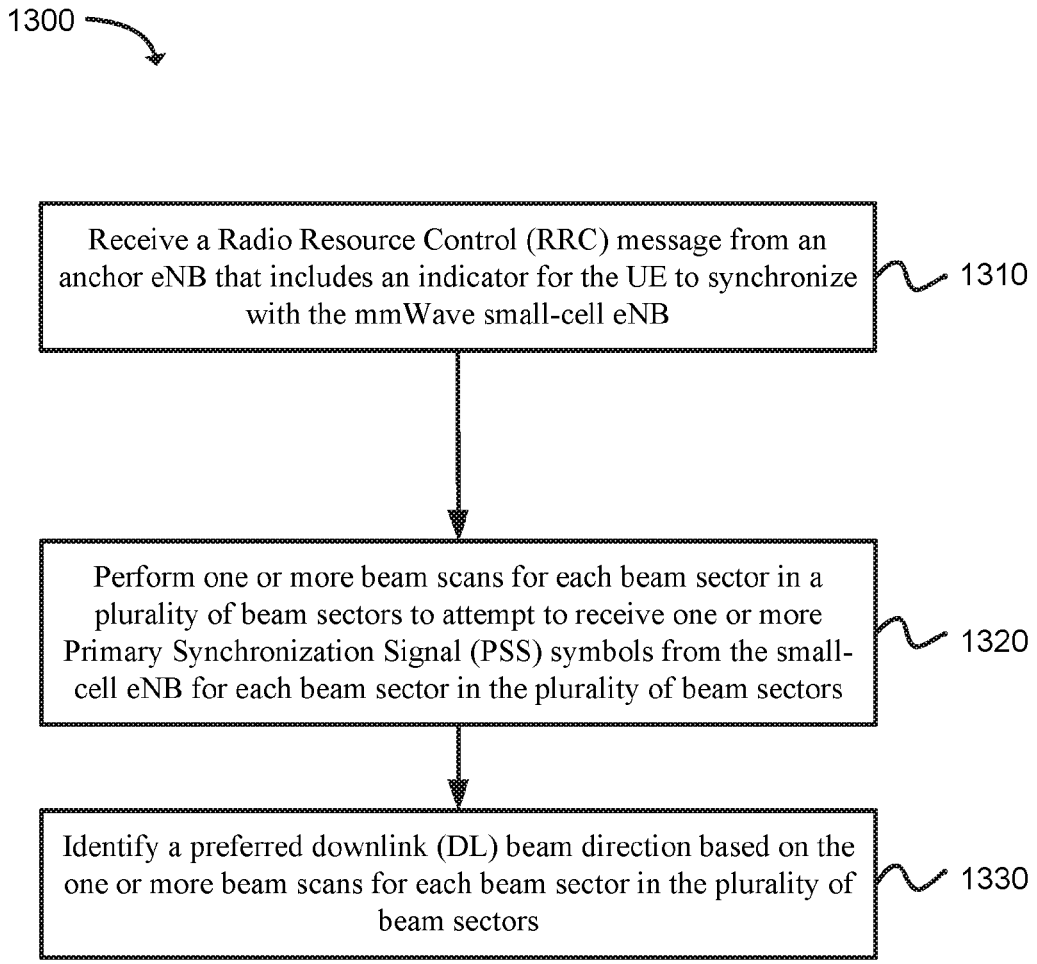
FIG. 13 illustrates functionality of a user equipment (UE) configured for Time Division Duplexing (TDD) in accordance with an example.

FIG. 13 illustrates functionality 1300 of a user equipment (UE) configured for Time Division Duplexing (TDD) in accordance with an example. The functionality 1300 can be implemented as a method or the functionality can be executed as instructions on a machine (e.g., by one or more processors), where the instructions are included on at least one non-transitory computer-readable storage medium.

As in block 1310, one or more processors and memory at the UE can be configured to receive a Radio Resource Control (RRC) message from an anchor eNB that includes an indicator for the UE to synchronize with the mmWave small-cell eNB. The RRC message from the anchor eNB can include one or more of: a number of beam sectors to be scanned, a number of PSS symbols to be scanned per beam sector and total number of PSS and SSS symbols that are to be transmitted to the UE from the small-cell eNB, or an indication of an SSS symbol used to indicate an end of the DL transmission sub-frame.

As in block 1320, the one or more processors and memory at the UE can be configured to perform one or more beam scans for each beam sector in a plurality of beam sectors to attempt to receive one or more Primary Synchronization Signal (PSS) symbols from the small-cell eNB for each beam sector in the plurality of beam sectors. In some examples, a codebook can be used to identify the plurality of beam sectors. Each beam scan in the one or more beam scans can have a predefined Orthogonal Frequency Division Multiplexing (OFDM) symbol duration.

The one or more processors and memory at the UE can be configured to perform time synchronization or frequency synchronization with the small-cell eNB based on the one or more beam scans for each beam sector in the plurality of beam sectors.

The one or more processors and memory at the UE can also be configured to receive one or more Secondary Synchronization Signal (SSS) symbols from the small-cell eNB to indicating an end of a downlink (DL) transmission sub-frame. In some examples, an SSS symbol that has an inverted sign can be received to indicate the end of the transmission sub-frame.

As in block 1330, the one or more processors and memory at the UE can be configured to identify a preferred downlink (DL) beam direction based on the one or more beam scans for each beam sector in the plurality of beam sectors. In some examples, a plurality of respective signal qualities for the plurality of beam sectors can be measured and the preferred DL beam direction can be identified based on the plurality of respective signal qualities. Each signal quality in the plurality of respective signal qualities can be based on one or more of: a received signal strength indication (RSSI), a reference signal received power (RSRP), or a reference signal received quality (RSRQ) value for a corresponding beam sector in the plurality of beam sectors.

Figure 14:
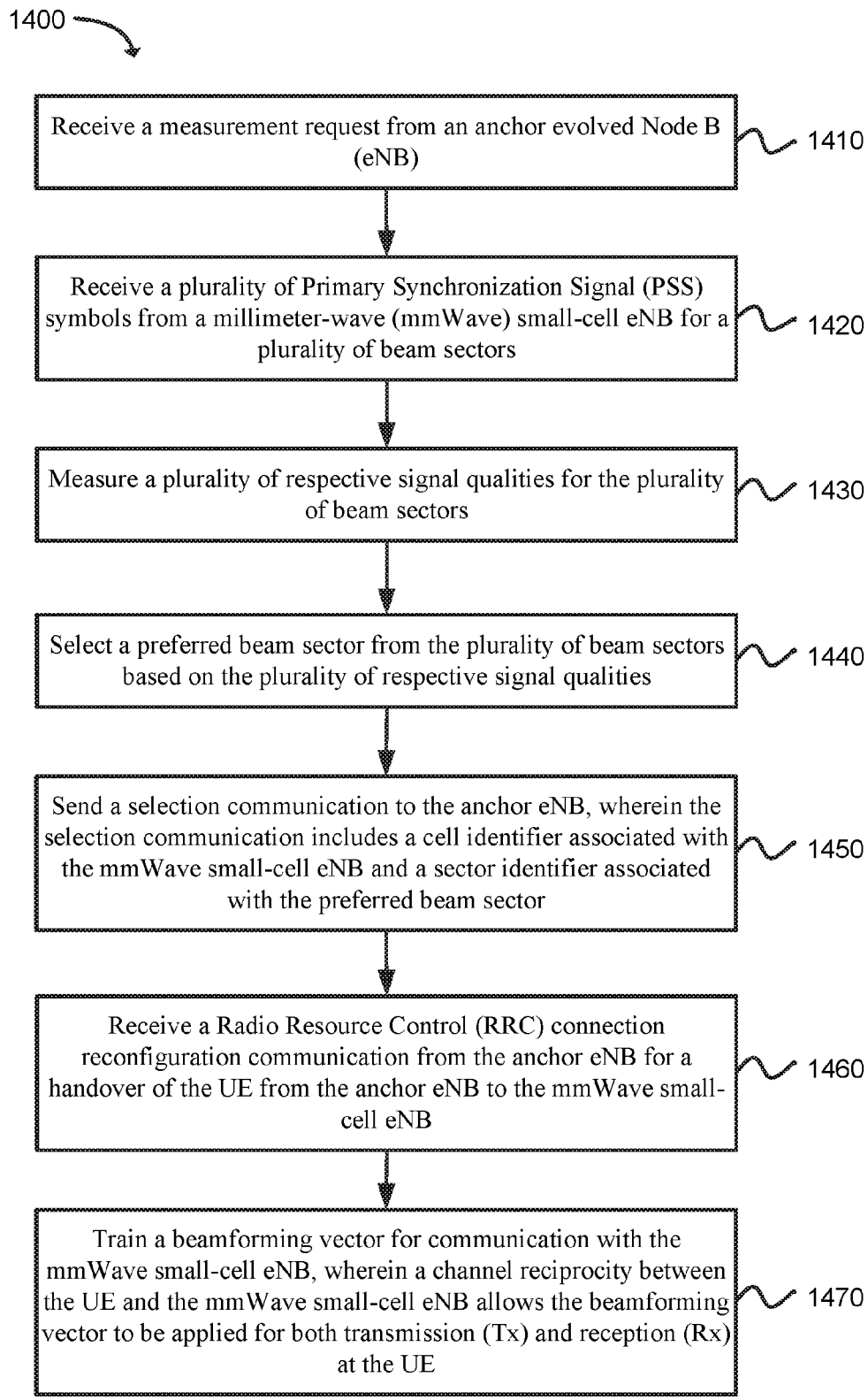
FIG. 14 illustrates functionality of a user equipment (UE) configured for Time Division Duplexing (TDD) in accordance with an example.

FIG. 14 illustrates functionality 1400 of a user equipment (UE) configured for Time Division Duplexing (TDD) in accordance with an example. The functionality 1400 can be implemented as a method or the functionality can be executed as instructions on a machine (e.g., by one or more processors), where the instructions are included on at least one non-transitory computer-readable storage medium.

As in block 1410, one or more processors and memory at the UE can be configured to receive a measurement request from an anchor evolved Node B (eNB).

As in block 1420, the one or more processors and memory at the UE can be configured to receive a plurality of Primary Synchronization Signal (PSS) symbols from a millimeter-wave (mmWave) small-cell eNB for a plurality of beam sectors. In some examples, at least one retransmission of the plurality of PSS symbols from the mmWave small-cell eNB can be received and a timing acquisition or a frequency acquisition can be performed using the plurality of PSS symbols.

As in block 1430, the one or more processors and memory at the UE can be configured to measure a plurality of respective signal qualities for the plurality of beam sectors. Each signal quality in the plurality of respective signal qualities is based on one or more of: a received signal strength indication (RSSI), a reference signal received power (RSRP), or a reference signal received quality (RSRQ) value for a corresponding beam sector in the plurality of beam sectors. A quality value for each beam sector in the plurality of beam sectors can be determined based on the respective beam sector's RSSI, RSRP, and RSRQ.

As in block 1440, the one or more processors and memory at the UE can be configured to select a preferred beam sector from the plurality of beam sectors based on the plurality of respective signal qualities. In examples where quality values are determined, the preferred beam sector can be selected based on the quality value for the preferred beam sector.

As in block 1450, the one or more processors and memory at the UE can be configured to send a selection communication to the anchor eNB, wherein the selection communication includes a cell identifier associated with the mmWave small-cell eNB and a sector identifier associated with the preferred beam sector.

As in block 1460, the one or more processors and memory at the UE can be configured to receive a Radio Resource Control (RRC) connection reconfiguration communication from the anchor eNB for a handover of the UE from the anchor eNB to the mmWave small-cell eNB. The RRC connection reconfiguration communication can be received via a Physical Downlink Shared Channel (PDSCH) and can include the cell identifier, a Master Information Block (MIB), and a set of Physical Random Access Channel (PRACH) codes from the anchor eNB. The set of PRACH codes can comprise a number of PRACH codes equal to a random access code base number multiplied by a number of sectors. Each PRACH code of the set of PRACH codes can comprise a base PRACH code and sector identifier information.

As in block 1470, the one or more processors and memory at the UE can be configured to train a beamforming vector for communication with the mmWave small-cell eNB, wherein a channel reciprocity between the UE and the mmWave small-cell eNB allows the beamforming vector to be applied for both transmission (Tx) and reception (Rx) at the UE.

Figure 15:
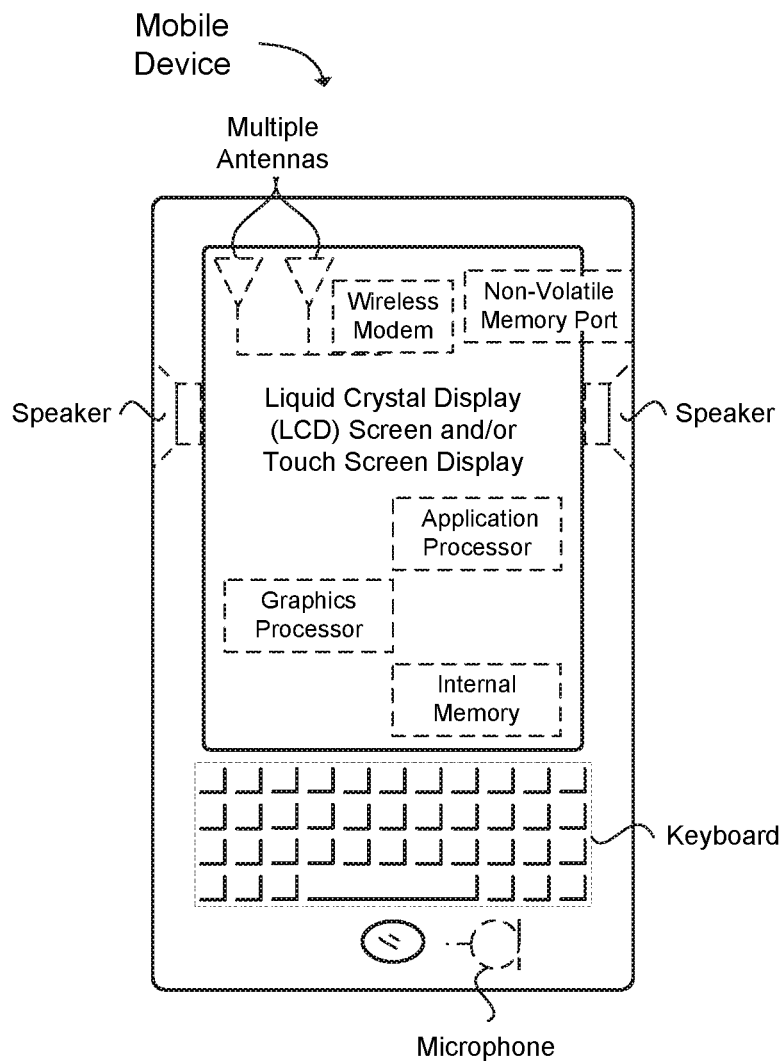
FIG. 15 provides an example illustration of a wireless device in accordance with an example.

FIG. 15 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 15 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Figure 16:
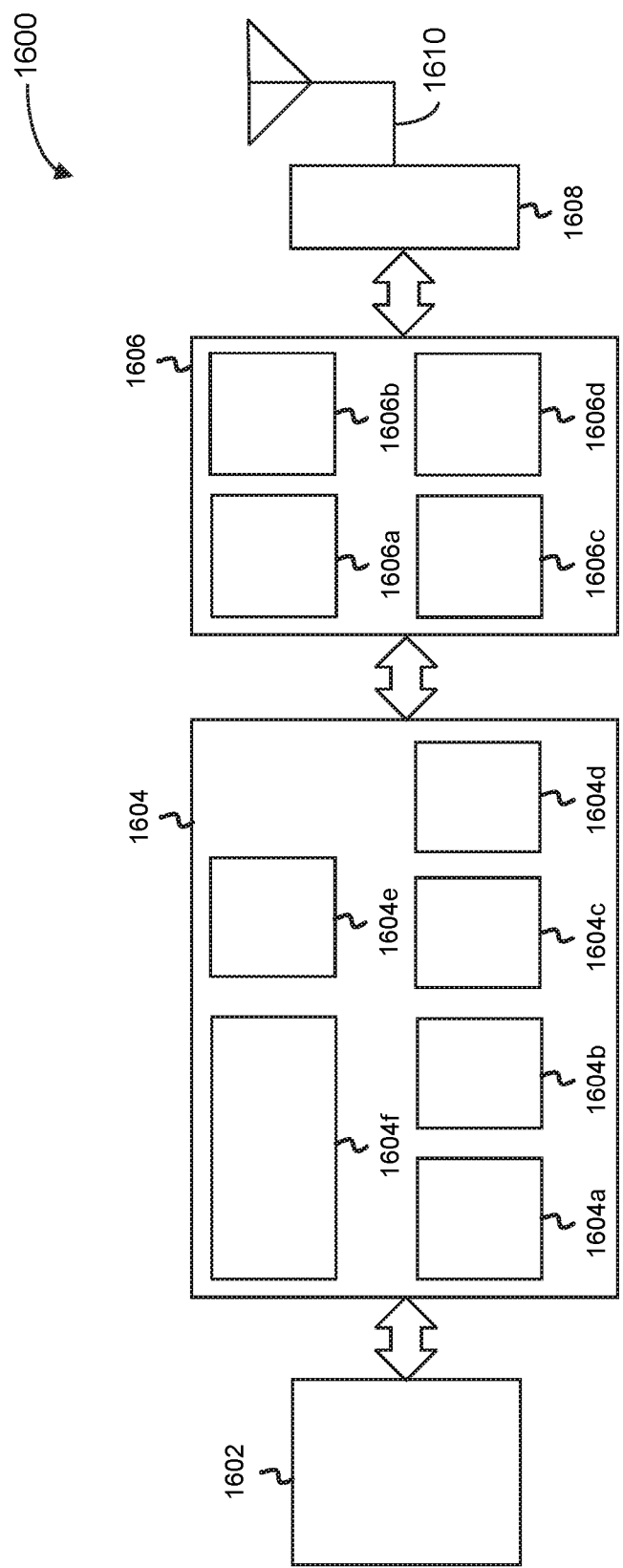
FIG. 16 provides an example illustration of a user equipment (UE) device, such as a wireless device, a mobile station (MS), a mobile wireless device, a mobile communication device, a tablet, a handset, or other type of wireless device.

FIG. 16 provides an example illustration of a user equipment (UE) device 1600, such as a wireless device, a mobile station (MS), a mobile wireless device, a mobile communication device, a tablet, a handset, or other type of wireless device. The UE device 1600 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 1600 can be configured to communicate using at least one wireless communication standard such as, but not limited to, 3GPP LTE, WiMAX, High Speed Packet Access (HSPA), Bluetooth, and WiFi. The UE device 1600 can communicate using separate antennas for each wireless communication standard or shared antennas for multiple wireless communication standards. The UE device 1600 can communicate in a wireless local area network (WLAN), a wireless personal area network (WPAN), and/or a WWAN.

In some embodiments, the UE device 1600 may include application circuitry 1602, baseband circuitry 1604, Radio Frequency (RF) circuitry 1606, front-end module (FEM) circuitry 1608 and one or more antennas 1610, coupled together at least as shown.

The application circuitry 1602 may include one or more application processors. For example, the application circuitry 1602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1604 may include circuitry such as, but not limited to, one or more single-core or multi-core processors. The baseband circuitry 1604 may include one or more baseband processors and/or control logic to process baseband signals received from a receive signal path of the RF circuitry 1606 and to generate baseband signals for a transmit signal path of the RF circuitry 1606. Baseband processing circuitry 1604 may interface with the application circuitry 1602 for generation and processing of the baseband signals and for controlling operations of the RF circuitry 1606. For example, in some embodiments, the baseband circuitry 1604 may include a second generation (2G) baseband processor 1604a, third generation (3G) baseband processor 1604b, fourth generation (4G) baseband processor 1604c, and/or other baseband processor(s) 1604d for other existing generations, generations in development or to be developed in the future (e.g., fifth generation (5G), 6G, etc.). The baseband circuitry 1604 (e.g., one or more of baseband processors 1604a-d) may handle various radio control functions that enable communication with one or more radio networks via the RF circuitry 1606. The radio control functions may include, but are not limited to, signal modulation/demodulation, encoding/decoding, radio frequency shifting, etc. In some embodiments, modulation/demodulation circuitry of the baseband circuitry 1604 may include Fast-Fourier Transform (FFT), precoding, and/or constellation mapping/demapping functionality. In some embodiments, encoding/decoding circuitry of the baseband circuitry 1604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1604e of the baseband circuitry 1604 may be configured to run elements of the protocol stack for signaling of the PHY, MAC, RLC, PDCP and/or RRC layers. In some embodiments, the baseband circuitry may include one or more audio digital signal processor(s) (DSP) 1604f The audio DSP(s) 1604f may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1604 and the application circuitry 1602 may be implemented together such as, for example, on a system on a chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

The RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path which may include circuitry to down-convert RF signals received from the FEM circuitry 1608 and provide baseband signals to the baseband circuitry 1604. RF circuitry 1606 may also include a transmit signal path which may include circuitry to up-convert baseband signals provided by the baseband circuitry 1604 and provide RF output signals to the FEM circuitry 1608 for transmission.

In some embodiments, the RF circuitry 1606 may include a receive signal path and a transmit signal path. The receive signal path of the RF circuitry 1606 may include mixer circuitry 1606a, amplifier circuitry 1606b and filter circuitry 1606c. The transmit signal path of the RF circuitry 1606 may include filter circuitry 1606c and mixer circuitry 1606a. RF circuitry 1606 may also include synthesizer circuitry 1606d for synthesizing a frequency for use by the mixer circuitry 1606a of the receive signal path and the transmit signal path. In some embodiments, the mixer circuitry 1606a of the receive signal path may be configured to down-convert RF signals received from the FEM circuitry 1608 based on the synthesized frequency provided by synthesizer circuitry 1606d. The amplifier circuitry 1606b may be configured to amplify the down-converted signals and the filter circuitry 1606c may be a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may be zero-frequency baseband signals, although this is not a requirement. In some embodiments, mixer circuitry 1606a of the receive signal path may comprise passive mixers, although the scope of the embodiments is not limited in this respect.

In some embodiments, the mixer circuitry 1606a of the transmit signal path may be configured to up-convert input baseband signals based on the synthesized frequency provided by the synthesizer circuitry 1606d to generate RF output signals for the FEM circuitry 1608. The baseband signals may be provided by the baseband circuitry 1604 and may be filtered by filter circuitry 1606c. The filter circuitry 1606c may include a low-pass filter (LPF), although the scope of the embodiments is not limited in this respect.

In some embodiments, the mixer circuitry 1606a of the receive signal path and the mixer circuitry 1606a of the transmit signal path may include two or more mixers and may be arranged for quadrature down-conversion and/or up-conversion respectively. In some embodiments, the mixer circuitry 1606a of the receive signal path and the mixer circuitry 1606a of the transmit signal path may include two or more mixers and may be arranged for image rejection (e.g., Hartley image rejection). In some embodiments, the mixer circuitry 1606a of the receive signal path and the mixer circuitry 1606a may be arranged for direct down-conversion and/or direct up-conversion, respectively. In some embodiments, the mixer circuitry 1606a of the receive signal path and the mixer circuitry 1606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606d may be a fractional-N synthesizer or a fractional N/N+1 synthesizer, although the scope of the embodiments is not limited in this respect as other types of frequency synthesizers may be suitable. For example, synthesizer circuitry 1606d may be a delta-sigma synthesizer, a frequency multiplier, or a synthesizer comprising a phase-locked loop with a frequency divider.

The synthesizer circuitry 1606d may be configured to synthesize an output frequency for use by the mixer circuitry 1606a of the RF circuitry 1606 based on a frequency input and a divider control input. In some embodiments, the synthesizer circuitry 1606d may be a fractional N/N+1 synthesizer.

In some embodiments, frequency input may be provided by a voltage controlled oscillator (VCO), although that is not a requirement. Divider control input may be provided by either the baseband circuitry 1604 or the applications processor 1602 depending on the desired output frequency. In some embodiments, a divider control input (e.g., N) may be determined from a look-up table based on a channel indicated by the applications processor 1602.

Synthesizer circuitry 1606d of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path which may include circuitry configured to operate on RF signals received from one or more antennas 1610, amplify the received signals and provide the amplified versions of the received signals to the RF circuitry 1606 for further processing. FEM circuitry 1608 may also include a transmit signal path which may include circuitry configured to amplify signals for transmission provided by the RF circuitry 1606 for transmission by one or more of the one or more antennas 1610.

In some embodiments, the FEM circuitry 1608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission (e.g., by one or more of the one or more antennas 1610).

In some embodiments, the UE device 1600 may include additional elements such as, for example, memory/storage, display (e.g., touch screen), camera, antennas, keyboard, microphone, speakers, sensor, and/or input/output (I/O) interface.

Examples

The following examples pertain to specific embodiments and point out specific features, elements, or steps that can be used or otherwise combined in achieving such embodiments.

Example 1 includes a millimeter-wave (mmWave) enhanced small-cell evolved Node B (eNB) configured for Time Division Duplexing (TDD) in an anchor-boosted cellular network, the mmWave enhanced small-cell eNB comprising one or more processors and memory configured to: send one or more Primary Synchronization Signal (PSS) symbols, for omnidirectional transmission from the mmWave enhanced small-cell eNB, for each beam sector in a plurality of beam sectors to enable a user equipment (UE) to perform time and frequency synchronization and to enable the UE identify a preferred beam direction for downlink transmissions from the mmWave enhanced small-cell eNB to the UE; send a Secondary Synchronization Signal (SSS) symbol to indicate an end of a transmission sub-frame; receive a response communication from the UE via a Physical Random Access Channel (PRACH); identify the preferred beam direction for downlink transmissions from the small-cell eNB to the UE based on the response communication; and send downlink data to the UE using a mmWave frequency band in the preferred beam direction.

Example 2 includes the mmWave enhanced small-cell eNB of example 1, wherein the one or more processors and memory are further configured to send one or more additional PSS symbols before sending the one or more SSS symbols in order to enable the UE to account for a timing misalignment between downlink transmissions from the mmWave enhanced small-cell eNB and an anchor eNB.

Example 3 includes the mmWave enhanced small-cell eNB of example 2, wherein the timing misalignment between downlink transmissions from the anchor eNB and the mmWave enhanced small-cell eNB is less than or equal to 1.5 mmWave Orthogonal Frequency Division Multiplexing (OFDM) symbols or is less than or equal to 3 mmWave OFDM symbols.

Example 4 includes the mmWave enhanced small-cell eNB of example 1, 2, or 3, wherein the plurality of beam sectors includes sixteen beam sectors.

Example 5 includes the mmWave enhanced small-cell eNB of example 1, 2, or 3, wherein the one or more processors and memory are further configured to send a plurality of SSS symbols, and wherein a last SSS symbol in the plurality of SSS symbols sent has an inverted sign in order to indicate the end of the transmission sub-frame.

Example 6 includes a user equipment (UE) configured to achieve downlink (DL) synchronization with a millimeter-wave (mmWave) small-cell evolved Node B (eNB) configured for time division duplexing (TDD), the UE comprising one or more processors and memory configured to: receive a Radio Resource Control (RRC) message from an anchor eNB that includes an indicator for the UE to synchronize with the mmWave small-cell eNB; perform one or more beam scans for each beam sector in a plurality of beam sectors to attempt to receive one or more Primary Synchronization Signal (PSS) symbols from the small-cell eNB for each beam sector in the plurality of beam sectors; receive one or more Secondary Synchronization Signal (SSS) symbols from the small-cell eNB indicating an end of a downlink (DL) transmission sub-frame; perform time synchronization and frequency synchronization with the small-cell eNB based on the one or more beam scans for each beam sector in the plurality of beam sectors; and identify a preferred downlink (DL) beam direction based on the one or more beam scans for each beam sector in the plurality of beam sectors.

Example 7 includes the UE of example 6, wherein the one or more processors and memory are further configured to receive an SSS symbol that has an inverted sign indicating the end of the transmission sub-frame.

Example 8 includes the UE of example 6 or 7, wherein the one or more processors and memory are further configured to: use a codebook to identify the plurality of beam sectors; measure a plurality of respective signal qualities for the plurality of beam sectors, wherein each signal quality in the plurality of respective signal qualities is based on one or more of: a received signal strength indication (RSSI), a reference signal received power (RSRP), or a reference signal received quality (RSRQ) value for a corresponding beam sector in the plurality of beam sectors; and identify the preferred DL beam direction based on the plurality of respective signal qualities.

Example 9 includes the UE of example 6, 7, or 8, wherein each beam scan in the one or more beam scans has a predefined Orthogonal Frequency Division Multiplexing (OFDM) symbol duration.

Example 10 includes the UE of example 6, 7, 8, or 9, wherein the RRC message from the anchor eNB includes one or more of: a number of beam sectors to be scanned, a number of PSS symbols to be scanned per beam sector and total number of PSS and SSS symbols that are to be transmitted to the UE from the small-cell eNB, or an indication of an SSS symbol used to indicate an end of the DL transmission sub-frame.

Example 11 includes a user equipment (UE) configured for time division duplexing (TDD), the UE comprising one or more processors and memory configured to: receive a measurement request from an anchor evolved Node B (eNB); receive a plurality of Primary Synchronization Signal (PSS) symbols from a millimeter-wave (mmWave) small-cell eNB for a plurality of beam sectors; measure a plurality of respective signal qualities for the plurality of beam sectors; select a preferred beam sector from the plurality of beam sectors based on the plurality of respective signal qualities; send a selection communication to the anchor eNB, wherein the selection communication includes a cell identifier associated with the mmWave small-cell eNB and a sector identifier associated with the preferred beam sector; receive a Radio Resource Control (RRC) connection reconfiguration communication from the anchor eNB for a handover of the UE from the anchor eNB to the mmWave small-cell eNB; and train a beamforming vector for communication with the mmWave small-cell eNB, wherein a channel reciprocity between the UE and the mmWave small-cell eNB allows the beamforming vector to be applied for both transmission (Tx) and reception (Rx) at the UE.

Example 12 includes the UE of example 11, wherein the one or more processors and memory are further configured to: receive the cell identifier, a Master Information Block (MIB), and a set of Physical Random Access Channel (PRACH) codes from the anchor eNB via a Physical Downlink Shared Channel (PDSCH).

Example 13 includes the UE of example 12, wherein each PRACH code of the set of PRACH codes comprises a base PRACH code and sector identifier information, and wherein the set of PRACH codes comprises a number of PRACH codes equal to a random access code base number multiplied by a number of sectors.

Example 14 includes the UE of example 11, 12, or 13, wherein the one or more processors and memory are further configured to: receive at least one retransmission of the plurality of PSS symbols from the mmWave small-cell eNB; and perform a timing acquisition or a frequency acquisition using the plurality of PSS symbols.

Example 15 includes the UE of example 11, 12, 13, or 14, wherein each signal quality in the plurality of respective signal qualities is based on one or more of: a received signal strength indication (RSSI), a reference signal received power (RSRP), or a reference signal received quality (RSRQ) value for a corresponding beam sector in the plurality of beam sectors, and wherein the one or more processors and memory are further configured to: determine a quality value for each beam sector in the plurality of beam sectors based on the respective beam sector's RSSI, RSRP, and RSRQ; and select the preferred beam sector based on the quality value for the preferred beam sector.

Example 16 includes a millimeter-wave (mmWave) enhanced small-cell evolved Node B (eNB) configured for Time Division Duplexing (TDD) in an anchor-boosted cellular network, the mmWave enhanced small-cell eNB comprising one or more processors and memory configured to: send one or more Primary Synchronization Signal (PSS) symbols, for omnidirectional transmission from the mmWave enhanced small-cell eNB, for each beam sector in a plurality of beam sectors to enable a user equipment (UE) to perform time and frequency synchronization and to enable the UE identify a preferred beam direction for downlink transmissions from the mmWave enhanced small-cell eNB to the UE; send a Secondary Synchronization Signal (SSS) symbol to indicate an end of a transmission sub-frame; receive a response communication from the UE via a Physical Random Access Channel (PRACH); identify the preferred beam direction for downlink transmissions from the small-cell eNB to the UE based on the response communication; and send downlink data to the UE using a mmWave frequency band in the preferred beam direction.

Example 17 includes the mmWave enhanced small-cell eNB of example 16, wherein the one or more processors and memory are further configured to send two PSS symbols for each beam sector in the plurality of beam sectors.

Example 18 includes the mmWave enhanced small-cell eNB of example 16 or 17, wherein the one or more processors and memory are further configured to send one or more additional PSS symbols before sending the one or more SSS symbols in order to enable the UE to account for a timing misalignment between downlink transmissions from the mmWave enhanced small-cell eNB and an anchor eNB.

Example 19 includes the mmWave enhanced small-cell eNB of example 18, wherein the timing misalignment between downlink transmissions from the anchor eNB and the mmWave enhanced small-cell eNB is less than or equal to 1.5 mmWave Orthogonal Frequency Division Multiplexing (OFDM) symbols.

Example 20 includes the mmWave enhanced small-cell eNB of example 18, wherein the misalignment between downlink transmissions from the anchor eNB and the small-cell mmWave eNB, is less than or equal to 3 mmWave Orthogonal Frequency Division Multiplexing (OFDM) symbols.

Example 21 includes the mmWave enhanced small-cell eNB of example 16, 17, 18, 19, or 20, wherein the plurality of beam sectors includes sixteen beam sectors.

Example 22 includes the mmWave enhanced small-cell eNB of claim example 16, 17, 18, 19, or 20, wherein the one or more processors and memory are further configured to send a plurality of SSS symbols, and wherein a last SSS symbol in the plurality SSS symbols sent has an inverted sign in order to indicate the end of the transmission sub-frame.

Example 23 includes a user equipment (UE) configured to achieve downlink (DL) synchronization with a millimeter-wave (mmWave) small-cell evolved Node B (eNB) configured for time division duplexing (TDD), the UE comprising one or more processors and memory configured to: receive a Radio Resource Control (RRC) message from an anchor eNB that includes an indicator for the UE to synchronize with the mmWave small-cell eNB; perform one or more beam scans for each beam sector in a plurality of beam sectors to attempt to receive one or more Primary Synchronization Signal (PSS) symbols from the small-cell eNB for each beam sector in the plurality of beam sectors; and identify a preferred downlink (DL) beam direction based on the one or more beam scans for each beam sector in the plurality of beam sectors.

Example 24 includes the UE of example 23, wherein the one or more processors and memory are further configured to: receive one or more Secondary Synchronization Signal (SSS) symbols from the small-cell eNB indicating an end of a downlink (DL) transmission sub-frame; and perform time synchronization and frequency synchronization with the small-cell eNB based on the one or more beam scans for each beam sector in the plurality of beam sectors.

Example 25 includes the UE of example 24, wherein the one or more processors and memory are further configured to receive an SSS symbol that has an inverted sign indicating the end of the transmission sub-frame.

Example 26 includes the UE of example 23, 24, or 25, wherein the one or more processors and memory are further configured to: measure a plurality of respective signal qualities for the plurality of beam sectors; identify the preferred DL beam direction based on the plurality of respective signal qualities.

Example 27 includes the UE of example 26, wherein each signal quality in the plurality of respective signal qualities is based on one or more of: a received signal strength indication (RSSI), a reference signal received power (RSRP), or a reference signal received quality (RSRQ) value for a corresponding beam sector in the plurality of beam sectors.

Example 28 includes the UE of example 23, 24, or 25, wherein each beam scan in the one or more beam scans has a predefined Orthogonal Frequency Division Multiplexing (OFDM) symbol duration.

Example 29 includes the UE of example 23, 24, or 25, wherein the one or more processors and memory are further configured to attempt to receive two PSS symbols for each beam sector in the plurality of beam sectors.

Example 30 includes the UE of example 23, 24, or 25, wherein the one or more processors and memory are further configured to use a codebook to identify the plurality of beam sectors.

Example 31 includes the UE of example 23, 24, or 25, wherein the RRC message from the anchor eNB includes one or more of: a number of beam sectors to be scanned, a number of PSS symbols to be scanned per beam sector and total number of PSS and SSS symbols that are to be transmitted to the UE from the small-cell eNB, or an indication of an SSS symbol used to indicate an end of the DL transmission sub-frame.

Example 32 includes a user equipment (UE) configured for time division duplexing (TDD), the UE comprising one or more processors and memory configured to: receive a measurement request from an anchor evolved Node B (eNB); receive a plurality of Primary Synchronization Signal (PSS) symbols from a millimeter-wave (mmWave) small-cell eNB for a plurality of beam sectors; measure a plurality of respective signal qualities for the plurality of beam sectors; select a preferred beam sector from the plurality of beam sectors based on the plurality of respective signal qualities; send a selection communication to the anchor eNB, wherein the selection communication includes a cell identifier associated with the mmWave small-cell eNB and a sector identifier associated with the preferred beam sector; receive a Radio Resource Control (RRC) connection reconfiguration communication from the anchor eNB for a handover of the UE from the anchor eNB to the mmWave small-cell eNB; and train a beamforming vector for communication with the mmWave small-cell eNB, wherein a channel reciprocity between the UE and the mmWave small-cell eNB allows the beamforming vector to be applied for both transmission (Tx) and reception (Rx) at the UE.

Example 33 includes the UE of example 32, wherein the one or more processors and memory are further configured to: receive the cell identifier, a Master Information Block (MIB), and a set of Physical Random Access Channel (PRACH) codes from the anchor eNB via a Physical Downlink Shared Channel (PDSCH).

Example 34 includes the UE of example 33, wherein the set of PRACH codes comprises a number of PRACH codes equal to a random access code base number multiplied by a number of sectors.

Example 35 includes the UE of example 33, wherein each PRACH code of the set of PRACH codes comprises a base PRACH code and sector identifier information.

Example 36 includes the UE of example 32, 33, 34, or 35, wherein the one or more processors and memory are further configured to: receive at least one retransmission of the plurality of PSS symbols from the mmWave small-cell eNB; and perform a timing acquisition or a frequency acquisition using the plurality of PSS symbols.

Example 37 includes the UE of example 32, 33, 34, or 35, wherein each signal quality in the plurality of respective signal qualities is based on one or more of: a received signal strength indication (RSSI), a reference signal received power (RSRP), or a reference signal received quality (RSRQ) value for a corresponding beam sector in the plurality of beam sectors.

Example 38 includes the UE of example 37, wherein the one or more processors and memory are further configured to: determine a quality value for each beam sector in the plurality of beam sectors based on the respective beam sector's RSSI, RSRP, and RSRQ; and select the preferred beam sector based on the quality value for the preferred beam sector.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages may be added to the logical flow for enhanced utility, accounting, performance, measurement, troubleshooting, or other purposes.

As used herein, the word "or" indicates an inclusive disjunction. For example, as used herein, the phrase "A or B" represents an inclusive disjunction of exemplary conditions A and B. Hence, "A or B" is false only if both condition A is false and condition B is false. When condition A is true and condition B is also true, "A or B" is also true. When condition A is true and condition B is false, "A or B" is true. When condition B is true and condition A is false, "A or B" is true. In other words, the term "or," as used herein, should not be construed as an exclusive disjunction. The term "xor" is used where an exclusive disjunction is intended.

As used herein, the term processor can include general-purpose processors, specialized processors such as VLSI, FPGAs, and other types of specialized processors, as well as base-band processors used in transceivers to send, receive, and process wireless communications.

It should be understood that many of the functional units described in this specification have been labeled as modules, in order to more particularly emphasize their implementation independence. For example, a module can be implemented as a hardware circuit (e.g., an application-specific integrated circuit (ASIC)) comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous.

Furthermore, the described features, structures, or characteristics can be combined in any suitable manner in one or more embodiments. In the foregoing description, numerous specific details are provided, such as examples of layouts, distances, network examples, etc., to provide a thorough understanding of some embodiments. One skilled in the relevant art will recognize, however, that the some embodiments can be practiced without one or more of the specific details, or with other methods, components, layouts, etc. In other instances, well-known structures, materials, or operations are not shown or described in detail to avoid obscuring aspects of different embodiments.

While the forgoing examples are illustrative of the principles used in various embodiments in one or more particular applications, it will be apparent to those of ordinary skill in the art that numerous modifications in form, usage and details of implementation can be made without the exercise of inventive faculty, and without departing from the principles and concepts of the embodiments. Accordingly, it is not intended that the invention be limited, except as by the claims set forth below.

What is claimed is:

1. A millimeter-wave (mmWave) enhanced small-cell evolved Node B (eNB) configured for Time Division Duplexing (TDD) in an anchor-boosted cellular network, the mmWave enhanced small-cell eNB comprising one or more processors and memory configured to:
   send one or more Primary Synchronization Signal (PSS) symbols, for omnidirectional transmission from the mmWave enhanced small-cell eNB, for each beam sector in a plurality of beam sectors to enable a user equipment (UE) to perform time and frequency synchronization and to enable the UE to identify a preferred beam direction for downlink transmissions from the mmWave enhanced small-cell eNB to the UE;
   send a Secondary Synchronization Signal (SSS) symbol comprising an inverted sign to indicate an end of a transmission sub-frame;
   receive a response communication from the UE via a Physical Random Access Channel (PRACH);
   identify the preferred beam direction for downlink transmissions from the mmWave enhanced small-cell eNB to the UE based on the response communication; and
   send downlink data to the UE using a mmWave frequency band in the preferred beam direction.

2. The mmWave enhanced small-cell eNB of claim 1, wherein the one or more processors and memory are further configured to send two PSS symbols for each beam sector in the plurality of beam sectors.

3. The mmWave enhanced small-cell eNB of claim 1, wherein the one or more processors and memory are further configured to send one or more additional PSS symbols before sending the one or more SSS symbols in order to enable the UE to account for a timing misalignment between downlink transmissions from the mmWave enhanced small-cell eNB and an anchor eNB.

4. The mmWave enhanced small-cell eNB of claim 3, wherein the timing misalignment between downlink transmissions from the anchor eNB and the mmWave enhanced small-cell eNB is less than or equal to 1.5 mmWave Orthogonal Frequency Division Multiplexing (OFDM) symbols.

5. The mmWave enhanced small-cell eNB of claim 3, wherein the misalignment between downlink transmissions from the anchor eNB and the small-cell mmWave eNB, is less than or equal to 3 mmWave Orthogonal Frequency Division Multiplexing (OFDM) symbols.

6. The mmWave enhanced small-cell eNB of claim 1, wherein the plurality of beam sectors includes sixteen beam sectors.

7. The mmWave enhanced small-cell eNB of claim 1, wherein the one or more processors and memory are further configured to send a plurality of SSS symbols, and wherein a last SSS symbol in the plurality SSS symbols sent has an inverted sign in order to indicate the end of the transmission sub-frame.

8. A user equipment (UE) configured to achieve downlink (DL) synchronization with a millimeter-wave (mmWave) small-cell evolved Node B (eNB) configured for time division duplexing (TDD), the UE comprising one or more processors and memory configured to:
   receive a Radio Resource Control (RRC) message from an anchor eNB that includes an indicator for the UE to synchronize with the mmWave small-cell eNB;
   perform one or more beam scans for each beam sector in a plurality of beam sectors to attempt to receive one or more Primary Synchronization Signal (PSS) symbols from the small-cell eNB for each beam sector in the plurality of beam sectors;

receive one or more Secondary Synchronization Signal (SSS) symbols from the small-cell eNB, wherein the one or more SSS symbols comprise an inverted sign to indicate an end of DL transmission subframe; and identify a preferred beam direction based on the one or more beam scans for each beam sector in the plurality of beam sectors.

9. The UE of claim 8, wherein the one or more processors and memory are further configured to:

perform time synchronization and frequency synchronization with the small-cell eNB based on the one or more beam scans for each beam sector in the plurality of beam sectors.

10. The UE of claim 8, wherein the one or more processors and memory are further configured to:

measure a plurality of respective signal qualities for the plurality of beam sectors;

identify the preferred DL beam direction based on the plurality of respective signal qualities.

11. The UE of claim 10, wherein each signal quality in the plurality of respective signal qualities is based on one or more of: a received signal strength indication (RSSI), a reference signal received power (RSRP), or a reference signal received quality (RSRQ) value for a corresponding beam sector in the plurality of beam sectors.

12. The UE of claim 8, wherein each beam scan in the one or more beam scans has a predefined Orthogonal Frequency Division Multiplexing (OFDM) symbol duration.

13. The UE of claim 8, wherein the one or more processors and memory are further configured to attempt to receive two PSS symbols for each beam sector in the plurality of beam sectors.

14. The UE of claim 8, wherein the one or more processors and memory are further configured to use a codebook to identify the plurality of beam sectors.

15. The UE of claim 8, wherein the RRC message from the anchor eNB includes one or more of: a number of beam sectors to be scanned, a number of PSS symbols to be scanned per beam sector and total number of PSS and SSS symbols that are to be transmitted to the UE from the small-cell eNB, or an indication of the SSS symbol used to indicate an end of the DL transmission sub-frame.

16. The UE of claim 8, wherein the UE includes at least one of an antenna, a touch sensitive display screen, a speaker, a microphone, a graphics processor, an application processor, internal memory, a non-volatile memory port, and combinations thereof.

17. A user equipment (UE) configured for time division duplexing (TDD), the UE comprising one or more processors and memory configured to:

receive a measurement request from an anchor evolved Node B (eNB);

receive a plurality of Primary Synchronization Signal (PSS) symbols from a millimeter-wave (mmWave) small-cell eNB for a plurality of beam sectors;

measure a plurality of respective signal qualities for the plurality of beam sectors;

select a preferred beam sector from the plurality of beam sectors based on the plurality of respective signal qualities;

send a selection communication to the anchor eNB, wherein the selection communication includes a cell identifier associated with the mmWave small-cell eNB and a sector identifier associated with the preferred beam sector;

receive a Radio Resource Control (RRC) connection reconfiguration communication from the anchor eNB for a handover of the UE from the anchor eNB to the mmWave small-cell eNB; and train a beamforming vector for communication with the mmWave small-cell eNB, wherein a channel reciprocity between the UE and the mmWave small-cell eNB allows the beamforming vector to be applied for both transmission (Tx) and reception (Rx) at the UE.

18. The UE of claim 17, wherein the one or more processors and memory are further configured to:

receive the cell identifier, a Master Information Block (MIB), and a set of Physical Random Access Channel (PRACH) codes from the anchor eNB via a Physical Downlink Shared Channel (PDSCH).

19. The UE of claim 18, wherein the set of PRACH codes comprises a number of PRACH codes equal to a random access code base number multiplied by a number of sectors.

20. The UE of claim 18, wherein each PRACH code of the set of PRACH codes comprises a base PRACH code and sector identifier information.

21. The UE of claim 17, wherein the one or more processors and memory are further configured to:

receive at least one retransmission of the plurality of PSS symbols from the mmWave small-cell eNB; and perform a timing acquisition or a frequency acquisition using the plurality of PSS symbols.

22. The UE of claim 17, wherein each signal quality in the plurality of respective signal qualities is based on one or more of: a received signal strength indication (RSSI), a reference signal received power (RSRP), or a reference signal received quality (RSRQ) value for a corresponding beam sector in the plurality of beam sectors.

23. The UE of claim 22, wherein the one or more processors and memory are further configured to:

determine a quality value for each beam sector in the plurality of beam sectors based on the respective beam sector's RSSI, RSRP, and RSRQ; and select the preferred beam sector based on the quality value for the preferred beam sector.

* * * * *